(12) United States Patent
Di Cairano et al.

(10) Patent No.: US 10,860,023 B2
(45) Date of Patent: Dec. 8, 2020

(54) SYSTEMS AND METHODS FOR SAFE DECISION MAKING OF AUTONOMOUS VEHICLES

(71) Applicant: Mitsubishi Electric Research Laboratories, Inc., Cambridge, MA (US)

(72) Inventors: Stefano Di Cairano, Newton, MA (US); Karl Berntorp, Watertown, MA (US); Heejin Ahn, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 252 days.

(21) Appl. No.: 16/027,467

(22) Filed: Jul. 5, 2018

(65) Prior Publication Data

US 2019/0391580 A1    Dec. 26, 2019

Related U.S. Application Data

(60) Provisional application No. 62/689,718, filed on Jun. 25, 2018.

(51) Int. Cl.
*G05D 1/00* (2006.01)
*G06N 5/02* (2006.01)
(Continued)

(52) U.S. Cl.
CPC ....... *G05D 1/0088* (2013.01); *B60W 30/0956* (2013.01); *B60W 50/0097* (2013.01);
(Continued)

(58) Field of Classification Search
CPC .......... G08G 5/0034; G08G 1/096838; G08G 5/0039; G08G 1/166; G08G 1/167;
(Continued)

(56) References Cited

U.S. PATENT DOCUMENTS

| 9,568,915 B1 | 2/2017 | Berntorp et al. |
| 9,915,948 B2 | 3/2018 | Di Cairano et al. |

(Continued)

FOREIGN PATENT DOCUMENTS

DE    102016212292 A1    8/2017

OTHER PUBLICATIONS

Vijay Govindarajan, Ruzena Bajcsy, "Human Modeling for Autonomous Vehicles: Reachability Analysis, Online Learning, and Driver Monitoring for Behavior Prediction." Electrical Engineering and Computer Sciences University of California at Berkeley. Technical Report No. UCB/EECS-2017-226 http://www2.eecs.berkeley.edu/Pubs/TechRpts/2017/EECS-2017-226.html. Dec. 15, 2017.

*Primary Examiner* — Behrang Badii
(74) *Attorney, Agent, or Firm* — Gennadiy Vinokur; James McAleenan; Hironori Tsukamoto

(57) ABSTRACT

Controlling a vehicle by producing a sequence of intermediate goals that includes specific goals, additional specific goals and optional goals, from a travel route for a prediction horizon. Testing a feasibility of each intermediate goal (IG), using a first model of motion of the vehicle and a first model of motion of the traffic, by the IG being achieved by satisfying traffic conditions and motion capabilities of the vehicle, after achieving the IG, a next goal of the specific goals and the additional specific goals can also be achieved. Compute a trajectory for each feasible IG, using a second model of motion of the vehicle and a second model of motion of the traffic, and compare each computed trajectory according to a numerical value determined by a cost function and determine satisfaction of constraints on the movement of the vehicle and the vehicle interaction with the road and the traffic.

24 Claims, 29 Drawing Sheets

(51) Int. Cl.
G05D 1/02 (2020.01)
B60W 30/095 (2012.01)
B60W 50/00 (2006.01)

(52) U.S. Cl.
CPC ......... G05D 1/0214 (2013.01); G05D 1/0274 (2013.01); G06N 5/022 (2013.01); *B60W 2554/00* (2020.02); *G05D 2201/0213* (2013.01)

(58) Field of Classification Search
CPC ....... G08G 1/096816; G08G 1/096827; G08G 1/096844; G08G 3/02; G08G 1/0968; G08G 1/0145; G05D 1/0005; G05D 1/02; G05D 1/0088; G05D 1/0212; G05D 1/0278; G05D 1/0217; G05D 1/0214; G05D 1/0274; G05D 2201/0213; G05D 1/0253; G05D 1/0206; G07C 5/0808; G07C 5/08; B60W 30/00; B60W 30/08; B60W 30/09; B60W 30/0956; B60W 50/0097; B60W 2554/00; B60W 31/18163; B60W 10/06; B60W 40/105; B60W 50/12; B60W 30/18154; B60W 60/00272; B60W 50/082; B60W 60/0027; B60W 60/00274; B60W 10/18; B60W 30/0953; B60W 10/20; B60W 50/087; B60W 60/0015; B60W 40/06; B60W 60/001; B60W 30/162; B60W 30/18163; B60W 50/10; G01C 21/00; G01C 21/3453; G01C 21/203; G01C 21/3602; G06F 19/00; G06Q 10/04; G06Q 50/30; G06N 5/022; G01S 13/931; G01S 17/931; G01S 13/00; G01S 17/00; B60T 7/18; B60T 8/86; B60T 7/22; B63H 25/00; G06K 9/00825; G06K 9/00791
See application file for complete search history.

(56) References Cited

U.S. PATENT DOCUMENTS

| | | | |
|---|---|---|---|
| 2008/0288164 A1* | 11/2008 | Lewis | G08G 5/0034 701/120 |
| 2017/0090478 A1* | 3/2017 | Blayvas | G07C 5/0808 |
| 2018/0129203 A1* | 5/2018 | Tafti | G05D 1/0005 |
| 2018/0143641 A1 | 5/2018 | Rao et al. | |
| 2018/0356819 A1* | 12/2018 | Mahabadi | B60W 30/09 |
| 2019/0286151 A1* | 9/2019 | Palanisamy | B60W 60/0011 |
| 2019/0291726 A1* | 9/2019 | Shalev-Shwartz | B60W 30/18163 |

* cited by examiner

| Requirements on Computed Trajectories |  |
|---|---|
| 1600 | Stay on the road |
| 1610 | Stay in the middle of the lane |
| 1620 | Maintain nominal longitudinal velocity |
| 1630 | Maintain safety margin to surrounding obstacles |
| 1640 | Maintain minimum distance to vehicles in the same lane |
| 1650 | Drive smoothly |

FIG. 16

SYSTEMS AND METHODS FOR SAFE DECISION MAKING OF AUTONOMOUS VEHICLES

FIELD

The present disclosure relates generally to autonomous driving and advanced driver-assistance systems, and, more particularly, to determine a sequence of decisions and controlling a motion of the vehicle taking into account the behavior of vehicles, bicycles, and pedestrians.

BACKGROUND

Conventional autonomously driving vehicles must be equipped with a control system that determines how the vehicle should move on the road, accounting legal driving rules and traffic, to achieve its driving objectives. The conventional control system determines the vehicle motion by analyzing the environment based on data acquired by the sensors and processed by recognition and mapping algorithms, by computing a desired vehicle path and speed, and by control the vehicle to follow that path using available vehicle actuators. Due to the complexity of such conventional operations, the conventional control system includes path planning and vehicle control. For instance, U.S. Pat. No. 9,915,948 discusses how the vehicle control and the path planning can be integrated to guarantee that the vehicle achieves a desired objective of the driving.

For example, the conventional path planning of the autonomous vehicle can execute a path planning system responsible for determining the path of the vehicle, that a vehicle motion should follow. Several choices are available, see for instance U.S. Pat. No. 9,568,915. These conventional path planning systems require knowing current vehicle information, a current environment information, and a goal of the vehicle motion. Due to the need to operate in real-time, a planning interval of the conventional path planner will not be able to cover the entire drive of the vehicle but only a certain sub-component.

Thus, there is need for systems and methods for determining goals for a path planning system of an autonomous vehicle that ensures that each intermediate goal can be achieved by a vehicle motion planned by a path planner in accordance with the traffic and driving rules, and that achieving a sequence of intermediate goals, leads to achieving the overall driving objectives.

SUMMARY

Some embodiments of the present disclosure are based on the recognition there is a finite set of the decisions an autonomous vehicle can make while moving toward a final destination. For instance, in city driving a set of decisions include most driving tasks such as whether to stay in a lane or change lanes, to maintain a speed or accelerate, and to yield to other vehicles at intersections. Thus, at least one realization is that while there are a finite set of decisions a vehicle can make, there is also an infinite number of trajectories that results in the same decision. Determining all the trajectories a vehicle can take to result in a certain decision, such as a lane change, while determining also whether the trajectories are possible to take to be consistent with a decision preventing a collision with a vehicle, is a daunting task and computationally expensive.

Some embodiments of the present disclosure are based on the realization that to determine whether a certain decision is to be made is dependent on whether that decision leads to a safe trajectory of the vehicle. However, determining such trajectories explicitly is difficult to implement in real time due to the computational expense. Consequently, several embodiments are based on understanding that determining whether certain decision leads to a safe trajectory of the vehicle, is consistent with determining what states the vehicle can be in to reach to the desired state the decision is associated to. For instance, a decision of changing lane should lead to that the vehicle ends up in the desired lane, possibly at a desired time. Several embodiments determine whether to change lane dependent on whether such a position in the other lane can be reached from the current position of the vehicle.

Other embodiments realize that it is not sufficient to determine whether a state of the vehicle consistent with the decision, such as lane change, is possible to reach from the current position of the vehicle. Instead, it is also necessary to determine whether other obstacles, such as cars, pedestrians, and bicycles, pose a risk of intersecting with the set of possible trajectories of the vehicle.

To this end, one embodiment determines the set of initial states of the vehicle that can reach a set consistent with a decision of the vehicle, where a state of the vehicle includes at least one of the positions of the vehicle, a velocity of the vehicle, and a heading rate of the vehicle. Doing in such a manner, it is possible to determine whether a decision is possible to safely perform or not.

Some embodiments of the present disclosure include controlling a vehicle by producing a sequence of intermediate goals from a travel route formed by a sequence of roads and turns for a prediction horizon using driving mapped data and vehicle data stored in a memory. The driving mapped data can include map data, such as addresses, road networks, intersections, stop sign locations, traffic light locations, a number and a position of traffic lanes and speed limits. The vehicle data can include parameters for behaviors of the vehicles, such as maximum acceleration, steering, and steering rate, among other things. The sequence of intermediate goals can include different types of intermediate goals such as specific goals, additional specific goals and optional goals. The specific goals can include specific turns at intersections that are specific in order to reach a final destination, additional specific goals can include vehicle operational constraints according to driving rules. For example, the additional specific goal may include the vehicle decelerating to stop at a stop line, the vehicle staying stopped at the stop line, and the vehicle staying on a specific lane at a specific intersection based on a turn to be taken at such intersection that is specific in order to reach the final destination, among other things. The optional goals can include the vehicle changing lanes without violating any of the specific goals or the additional specific goals. It is worth noting that, although possibly large, the number of goal is finite, so that the execution of an operation on each goal, or on a specific subset of goals, can be completed in a finite number of steps. It is contemplated the referenced names to the different types of intermediate goals could be referenced with another term/phrase, by non-limiting example, such as mandatory goals, identifiable goals or special goals (i.e. specific goals), additional mandatory goals, addition identifiable goals or additional special goals, (i.e. additional specific goals).

Further, the present disclosure includes testing a feasibility of each intermediate goal in the sequence, using a first model of motion of the vehicle and a first model of motion of the traffic, along with determining that the intermediate goal satisfies traffic conditions and motion capabilities of the vehicle, and also that the intermediate goal is able of completing a next goal among the specific goals and the additional specific goals.

To that end, some embodiments of the present disclosure can include a control system for the vehicle that, for example use a module to implement the testing the feasibility of each intermediate goal in the sequence. Although, using modules can be used to implement steps of some embodiments of the present disclosure the modules are not required. For example, it is contemplated that instead of using modules stored in the memory, a processor can implement the steps without the use of the modules. By non-limited example, a controller or processor may include a routing module, decision making module and a planning and control module, wherein the planning and control module contains sub-modules such as, by non-limiting example, a motion planning sub-module, a vehicle control sub-module and an actuator control sub-module.

For example, a hardware processor can be configured to partition or segment a travel path formed by a sequence of roads and turns into a set of a sequence of specific goals from the stored data in the memory, wherein a routing module can be configured to implement such tasks.

Further, the control system can use the decision making module to test the feasibility of each intermediate goal using a first model of motion of the vehicle and a first model of motion of traffic surrounding the vehicle at the current state, to select from the set of intermediate goals a set of feasible intermediate goals.

An initial realization of the present disclosure came in designing steps of the decision making module, which included the need to determine whether a certain decision is to be made, which is dependent on whether that decision leads to a safe trajectory of the vehicle. However, determining such trajectories explicitly is a daunting task, as noted above. Consequently, learned from experimentation is that associated with determining whether a certain decision leads to a safe trajectory of the vehicle, is that the decision needs to be consistent with determining what states the vehicle can be in, to reach to the desired state. For instance, a decision of changing lane should lead to that the vehicle ends up in the desired lane, possibly at a desired time. Several embodiments determine whether to change lanes dependent on whether such a position in the other lane can be reached from the current position of the vehicle.

Further another realization is that it is not sufficient to determine whether a state of the vehicle is consistent with the decision, such as lane change, is possible to reach from the current position of the vehicle. Instead, what is also necessary is to determine whether other obstacles, such as cars, pedestrians, and bicycles, pose a risk of intersecting with the set of possible trajectories of the vehicle. To this end, some embodiments determine the set of initial states of the vehicle which can reach a set consistent with a decision of the vehicle, where a state of the vehicle includes at least one of the positions of the vehicle, a velocity of the vehicle, and a heading rate of the vehicle. Doing in such a manner, it is possible to determine whether a decision is possible to safely perform or not.

For example, some embodiments of the present disclosure are based on the recognition of the necessity to use different motion models for checking what intermediate objectives the vehicle may be able to achieve in the near future, and for generating the trajectory and for controlling the vehicle according to such a trajectory. For example, in order to check if the vehicle is capable of achieving a sequence of goals, a long future horizon needs to be considered. Having a complicated physical model to compute the motion of the vehicle over the extended future horizon is computationally difficult. Conversely, when the immediate goal is known, the control of the vehicle according to the desired trajectory can consider only a short future horizon. To that end, in some embodiments, the controller determines the next goal using the first, i.e., simplified, motion model, while planning and control uses at least a second, i.e., more complex, motion model.

Another realization of the present disclosure is that one can decompose the problem in terms of discrete decisions and continuous decisions where a decision making module operates discrete decisions, such as whether to change lane or stay in the current lane, whether to start decelerating to stop at the stop line or not, whether to cross the intersection or not, and converts this into feasible intermediate goals for the planning and control module. The planning and control module can receive the current feasible intermediate goal and possibly additional parameters for adjusting its computation to the current feasible intermediate goal from the decision making module, and performs its computation. The planning and control module can inform the decision making module of the achievement of the current feasible intermediate goal, or the impossibility of achieving the current feasible intermediate goal.

Thus, the decision making module can process the information from routing module using a map stored in the memory to produce a sequence of goals, and, using information from sensors and communication of the vehicle, select one or more alternative current goals to provide to the planning and control module, which uses those goals to determine and execute the current trajectory.

For example, some embodiments implement the steps of the motion planning submodule of the planning and control module to compute a trajectory for each feasible intermediate goal, using a second model of motion of the vehicle and a second model of motion of the traffic. Then, compare each computed trajectory according to a numerical value determined by a cost function. Determine that the trajectory satisfies constraints for both on the movement of the vehicle and a metric of performance, to determine a control input. Wherein, the control input can be mapped via a vehicle controller to a control command to at least one actuator of the vehicle. Controlling the motion of the vehicle via an actuator controller using the control command to the at least one actuator of the vehicle. Wherein the steps of the method are implemented using a processor of the vehicle.

Consequently, the decision making module, can iteratively, for each time period of multiple sequential time periods (i.e. prediction horizon of multiple prediction horizons), at a starting position to the final destination, use the first model of motion of the vehicle and the first model of motion of the traffic, to select one or more feasible intermediate goal from the sequence of intermediate goals, based on a vehicle state and traffic conditions at a beginning of the time period. If, the one or more feasible intermediate goal satisfies constraints including the traffic conditions, motion capabilities of the vehicle, and is capable of completing the next goal among specific goals and additional specific goals, then, the one or more feasible intermediate goal can be selected as the control input.

It is possible for some alternative embodiments of the present disclosure to have a decision making module that processes as a hybrid system, which is a set of continuous vehicle dynamics associated with each mode, or decision. The number of possible trajectories to be consistent with a decision is limited. However, there are very few decisions, hence, modeling the system as a hybrid system with a finite set of decisions, and utilizing previous embodiments of determining the set of initial states of the vehicle can reach a set consistent with a decision of the vehicle. Such that this permits for a computationally fast problem formulation of finding a safe discrete mode sequence instead of optimizing and finding the best combination of trajectories and decisions, which is computationally hard, as well as computationally costly in terms of extended computational time and requires robust computer hardware.

It is possible for some alternative embodiments of the present disclosure to have a motion planning sub-module of the vehicle and other objects as models such as a disturbance, to account for an environment that is not entirely deterministic. Another embodiment can determine a set of safe mode switches under such disturbances, which allows a vehicle, hence the passengers of the vehicle, to have more cautious driving.

Other embodiments may include other aspects such as, for example, a set of regions of states of the dynamics of the vehicle that are determined for a corresponding set of points defining desired heading angles corresponding to typical driving on the road traveled by the vehicle. Each state of the dynamics includes a longitudinal displacement, a lateral displacement, and the lateral orientation of the vehicle. Each region defines a set of the states of the dynamic determined such that the vehicle having a state within a region leads to a behavior consistent with a decision of the vehicle.

Further, some embodiments may include aspects such as obtaining information from turning lights of other vehicles, onboard sensors, vehicle to vehicle communication, and stop signal information that can be used to provide information to the decision making process. Other embodiments can use this information to determine whether other objects on or close to the road pose any risk of entering the set of regions of states for the dynamics of the own vehicle. Further, some embodiments may utilize the information about the mode switches and send the data to a motion planner, which based on the safe state sequence, can determine a trajectory of the vehicle consistent with the decisions. Further still, some embodiments can include aspects that determine a set of control inputs to the vehicle together with the decision sequence, that, when used by the vehicle, can satisfy the desired mode sequence.

It is possible that alternative embodiments may transfer the determined set of control inputs, the state sequence, and the decision sequence to a motion planner, which uses the set of control inputs and state sequence as a reference when determining the trajectory corresponding to the decision sequence. Doing in such a manner allows the decision making process to focus on long-term decisions of the vehicle and the motion planner to take care of the detailed trajectory planning of the vehicle. Further, some embodiments may include aspects where the set of decisions are to be stored, together with the control inputs and state sequence, in a memory of the vehicle that are used by the motion planner to extract partial information and not plan the whole state sequence in one step.

Accordingly, one embodiment of the present disclosure includes a control system of a vehicle including a memory to store data including driving mapped data and vehicle data. A hardware processor configured to produce a sequence of intermediate goals (SIG) from a travel route formed by a sequence of roads and turns for each prediction horizon, using the driving mapped data and the vehicle data. Wherein the SIG includes specific goals which are specific turns at intersections that are specific in order to reach a final destination, additional specific goals that includes vehicle operational constraints according to driving rules, and optional goals. Test a feasibility of each intermediate goal, using a first model of motion of the vehicle and a first model of motion of the traffic. Based on a vehicle state and traffic conditions at a beginning of the prediction horizon, and that the intermediate goal is achieved by satisfying the traffic conditions and motion capabilities of the vehicle, after achieving the intermediate goal a next goal among the specific goals and the additional specific goals can also be achieved. Compute a trajectory for each feasible intermediate goal, using a second model of motion of the vehicle and a second model of motion of the traffic, and compare each computed trajectory according to a numerical value determined by a cost function and determine the satisfaction of constraints on the movement of the vehicle and the vehicle interaction with the road and the traffic. A vehicle controller to compute a control input to at least one actuator of the vehicle so that the vehicle motion produces a trajectory as close to the computed trajectory. At least one actuator controller to execute the control input to the at least one actuator of the vehicle to modify the motion of the vehicle.

Another embodiment of the present disclosure includes a method for controlling a vehicle, including producing a sequence of intermediate goals (SIG) from a travel route formed by a sequence of roads and turns for each prediction horizon using driving mapped data and vehicle data stored in a memory. Wherein the SIG includes specific goals, additional specific goals and optional goals. Testing a feasibility of each intermediate goal, using a first model of motion of the vehicle and a first model of motion of the traffic, along with determining that the intermediate goal is achieved by satisfying traffic conditions and motion capabilities of the vehicle, after achieving the intermediate goal, a next goal among the specific goals and the additional specific goals can also be achieved. Computing a trajectory for each feasible intermediate goal, using a second model of motion of the vehicle and a second model of motion of the traffic, and comparing each computed trajectory according to a numerical value determined by a cost function, and determine the satisfaction of constraints on the movement of the vehicle and the vehicle interaction with the road and the traffic. Computing a control input via a vehicle controller to at least one actuator of the vehicle so that the vehicle motion produces a trajectory as close to the computed trajectory. Modifying the motion of the vehicle via at least one actuator controller to execute the control input to the at least one actuator of the vehicle, wherein the steps of the method are implemented using a processor of the vehicle.

Another embodiment of the present disclosure includes a non-transitory computer readable memory embodied thereon a program executable by a processor for performing a method. The method including producing a sequence of intermediate goals (SIG) from a travel route formed by a sequence of roads and turns for each prediction horizon using driving mapped data and vehicle data received from an input interface. Wherein the SIG includes specific goals, additional specific goals and optional goals. Testing a feasibility of each intermediate goal, using a first model of motion of the vehicle and a first model of motion of the traffic, along with determining that the intermediate goal is achieved by satisfying traffic conditions and motion capabilities of the vehicle, after achieving the intermediate goal, a next goal among the specific goals and the additional specific goals can also be achieved. Computing a trajectory for each feasible intermediate goal, using a second model of motion of the vehicle and a second model of motion of the traffic, and comparing each computed trajectory according to a numerical value determined by a cost function, and determine the satisfaction of constraints on the movement of the vehicle and the vehicle interaction with the road and the traffic. Computing a control input via a vehicle controller to at least one actuator of the vehicle so that the vehicle motion produces a trajectory as close to the computed trajectory. Modifying the motion of the vehicle via at least one actuator controller to execute the control input to the at least one actuator of the vehicle, wherein the steps of the method are implemented using a processor of the vehicle.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 16 illustrates an exemplar list of possible requirements on the motion of an autonomous vehicle driving on roads, according to embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1:
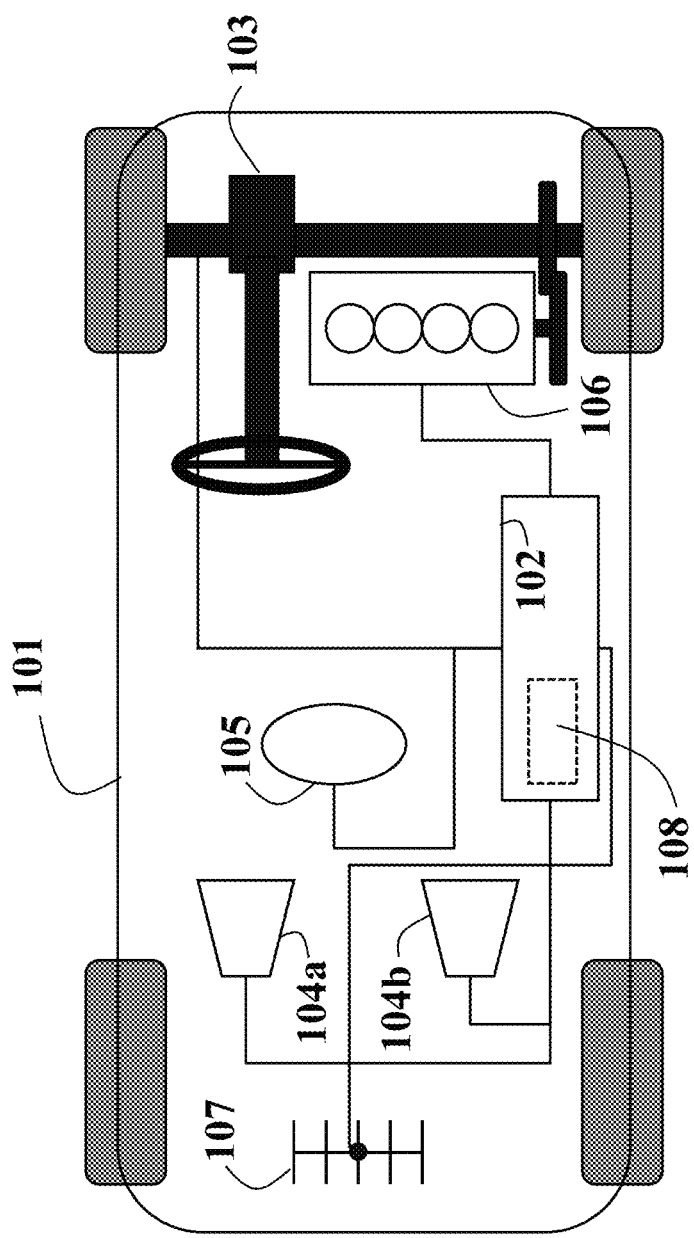
FIG. 1 is a schematic of a vehicle including a control unit employing principles of some embodiments of the present disclosure.

FIG. 1 is a schematic of a vehicle including a control unit employing principles of some embodiments of the present disclosure. For example, FIG. 1 shows a schematic of a vehicle 101 including a control unit 102 employing principles of some embodiments of the present disclosure. As used herein, the vehicle 101 can be any type of wheeled vehicle, such as a passenger car, bus, or rover. Also, the vehicle 101 can be an autonomous or semi-autonomous vehicle. For example, some embodiments control the motion of the vehicle 101. Examples of the motion include lateral motion of the vehicle controlled by a steering system 103 of the vehicle 101. The steering system 103 is controlled by the controller 102.

The vehicle can also include an engine 106, which can be controlled by the controller 102 or by other components of the vehicle 101. The vehicle 101 can also include one or more sensors 105 to sense, by non-limiting example, its current motion quantities and internal status. Examples of the sensors 105 can include global positioning system (GPS), accelerometers, inertial measurement units, gyroscopes, shaft rotational sensors, torque sensors, deflection sensors, pressure sensor, and flow sensors. The vehicle can be equipped with a transceiver 107 enabling communication capabilities of the controller 102 through wireless communication channels via an input interface 108. The vehicle can also include one or more other sensors 104a, 104b to sense the surrounding environment. Examples of the sensors 104a, 104b can include distance range finders, radars, lidars, and cameras. Alternatively, information about the surrounding environment can be received through the transceiver 107. The vehicle is equipped with map database system that stores information about the road in the area where the vehicle operates, or it can access map information stored remotely through the transceiver 107.

Figure 2:
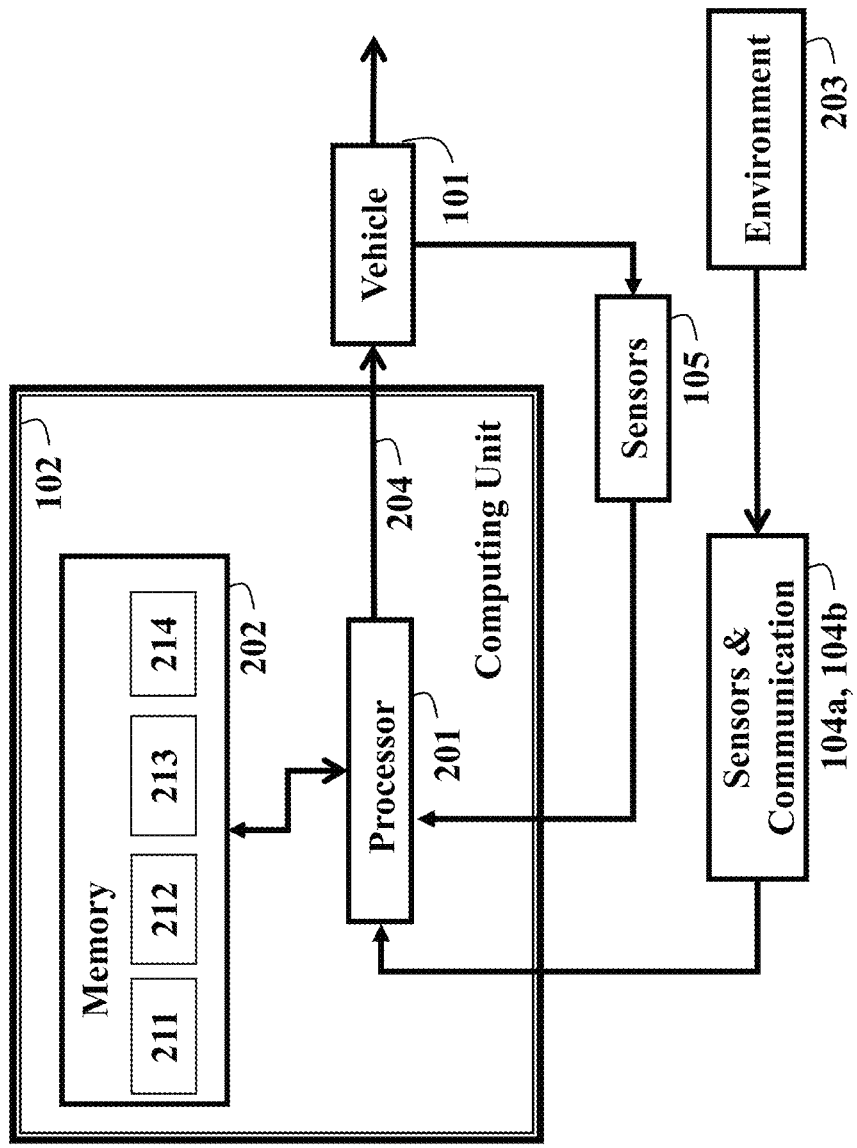
FIG. 2 is a block diagram of the control unit of FIG. 1 according to some embodiments of the present disclosure.

FIG. 2 is a block diagram of the control unit of FIG. 1 according to some embodiments of the present disclosure. For example, FIG. 2 shows a block diagram of the control unit 102 according to one embodiment of the present disclosure. The controller 102 includes a hardware processor 201 connected to a memory 202, e.g., a non-transitory computer readable medium. In some implementations, the memory 202 includes a first section 211 for storing information about the vehicle and a second section 212 for storing a program for controlling the vehicle, a third section 213 for storing driving map data, and a fourth section 214 for storing motion models of the traffic.

For example, the first section 211 of the memory 202 can store parameters for the behavior of the vehicles, such as maximum acceleration, steering, and steering rate, as well as store a first model of motion of the vehicle and a second model of the motion of the vehicle. In various embodiments, the number and complexity of equations describing the second model of motion of the vehicle is higher that the number and complexity of equations describing the first model of motion of the vehicle. Also, for example, the fourth section 214 of the memory 202 can store a first model of motion of the traffic and a second model of the motion of the traffic.

Still referring to FIG. 2, in various embodiments, the number and complexity of equations describing the second model of motion of the traffic is higher that the number and complexity of equations describing the first model of motion of the traffic. Those embodiments are based on recognition of the necessity to use different motion models for checking what intermediate objectives the vehicle may be able to achieve in the near future, and for generating the trajectory and for controlling the vehicle according to such a trajectory. For example, in order to check if the vehicle is capable of achieving a sequence of goals, a long future horizon needs to be considered. Having a high order physical model to compute the motion of the vehicle over the extended future horizon is computationally difficult. Conversely, when the immediate goal is known, the control of the vehicle according to the desired trajectory can consider only a short future horizon. To that end, in some embodiments, the controller 102 determines the next goal using the first, i.e., low order motion model, while planning and control uses at least a second, i.e., higher order, motion model.

The second section 212 of the memory 202 can have embodied thereon a program executable by the processor 201 for performing a method for controlling the vehicle 101.

Still referring to FIG. 2, the third section 213 of the memory 202 includes map information, such as addresses and road networks, and it may also include additional information such as intersections, stop and traffic light locations, number and position of lanes, speed limit, etc. The map information may be stored already in the third section of the memory 213 when the vehicle starts driving, or alternatively, this information is made available to the control unit by the communication transceiver 107 and the environment sensors 104a, 104b.

The processor 201 can be any computational device capable of performing computations, and can include one or many physical devices of the same or of different types. It is possible that the processor 201 can include multiple computational devices, e.g., microprocessors. Similarly, the memory 202 can be any logical memory and/or non-transitory computer readable storage medium capable of storing information, and can include one or more physical information storage means, of the same or of different types. The computations performed by the processor 201 are commanded by the program stored in the second section of the memory 212, and use the vehicle information stored in the first section of the memory 211, the information about the map stored in the second section of the memory 213, the information about the vehicle 101 obtained from the sensors 105, the information of the environment 203 obtained from the sensors 104a, 104b. The computation of the processor 201 results in commands 204 that change the motion of the vehicle.

Still referring to FIG. 2, the program executed by the processor 201 enables autonomous driving (AD) of the vehicle 101. During this operation, the program executed by the processor 201 aims at achieving specific final objective of driving, such as reaching a specific location. The final objective is achieved by appropriately influencing the motion of the vehicle 101. The software program executed by the processor 201 can logically be separated into multiple modules. For example, in one embodiment, the program executed by the processor includes at least two modules arranged in a sequence as layers such that output of one layer is an input to a next layer. As used herein, such layering specifies layers or logical modules of the control unit 102, and allows separating the control into different stages requiring different information.

Figure 3:
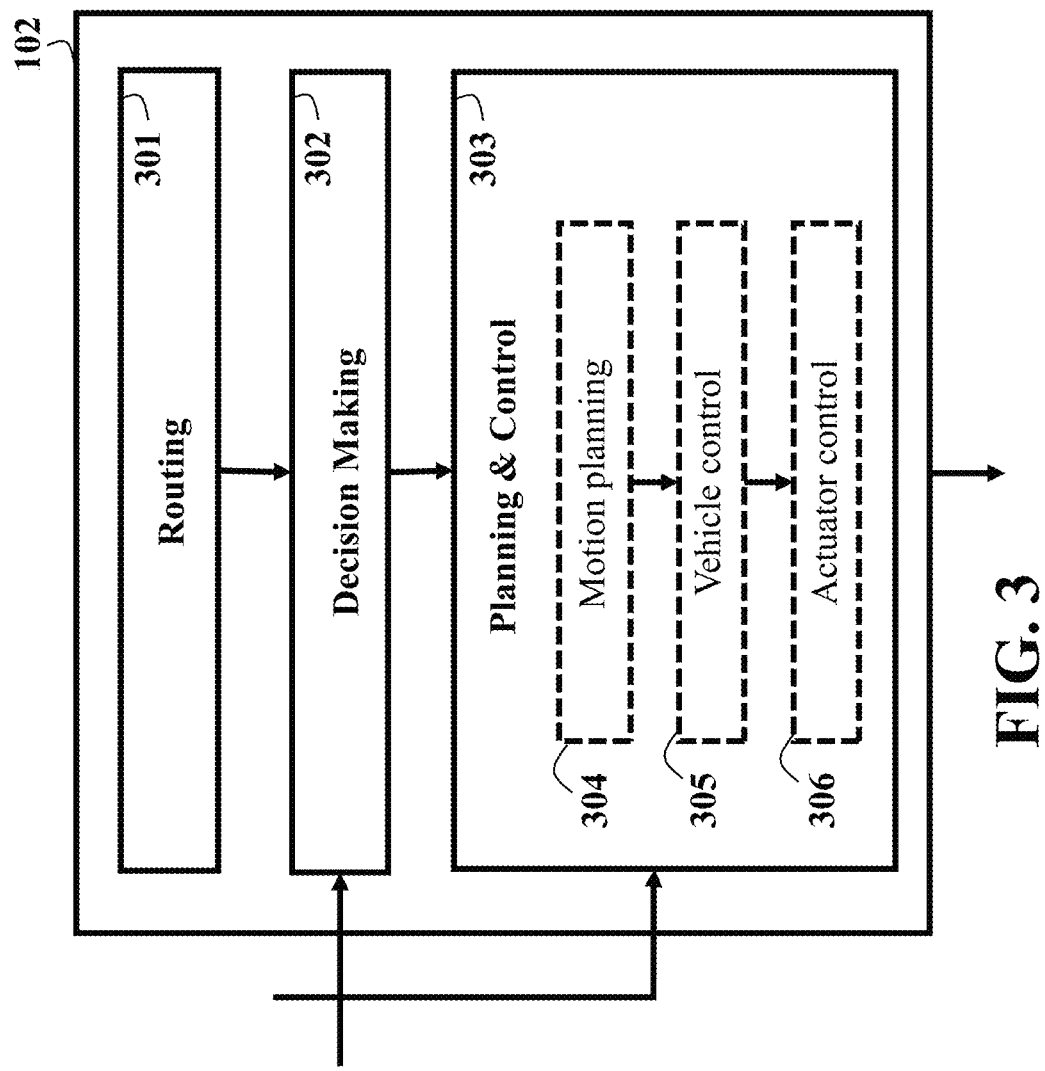
FIG. 3 is a schematic of the layers of the control unit according to some embodiments of the present disclosure.

FIG. 3 shows a schematic of the layers of the control unit according to one embodiment of the present disclosure. In this embodiment, the control unit 102 includes three layers of the control. The Routing 301 uses the static map information stored in the third section of the memory 213 of FIG. 2 and the current position of the vehicle obtained from sensors 104a, 104b to determine a sequence of roads in the road network that the vehicle must traverse from its current position to reach its final destination as provided for instance by the user. The Routing module can be implemented by a known Car Navigation system. The Vehicle Control submodule 305 determines commands of the vehicle actuators, such as steering, acceleration, deceleration, that modify the vehicle behavior so that the vehicle achieves an actual trajectory as close as possible to the current best trajectory. The commands to the vehicle actuators are then received by the Actuator Control sub-module 306 that modifies the control signals to the actuators, such as electric motor voltage, throttle opening, brake pads pressure, to achieve the desired vehicle commands.

Figure 4:
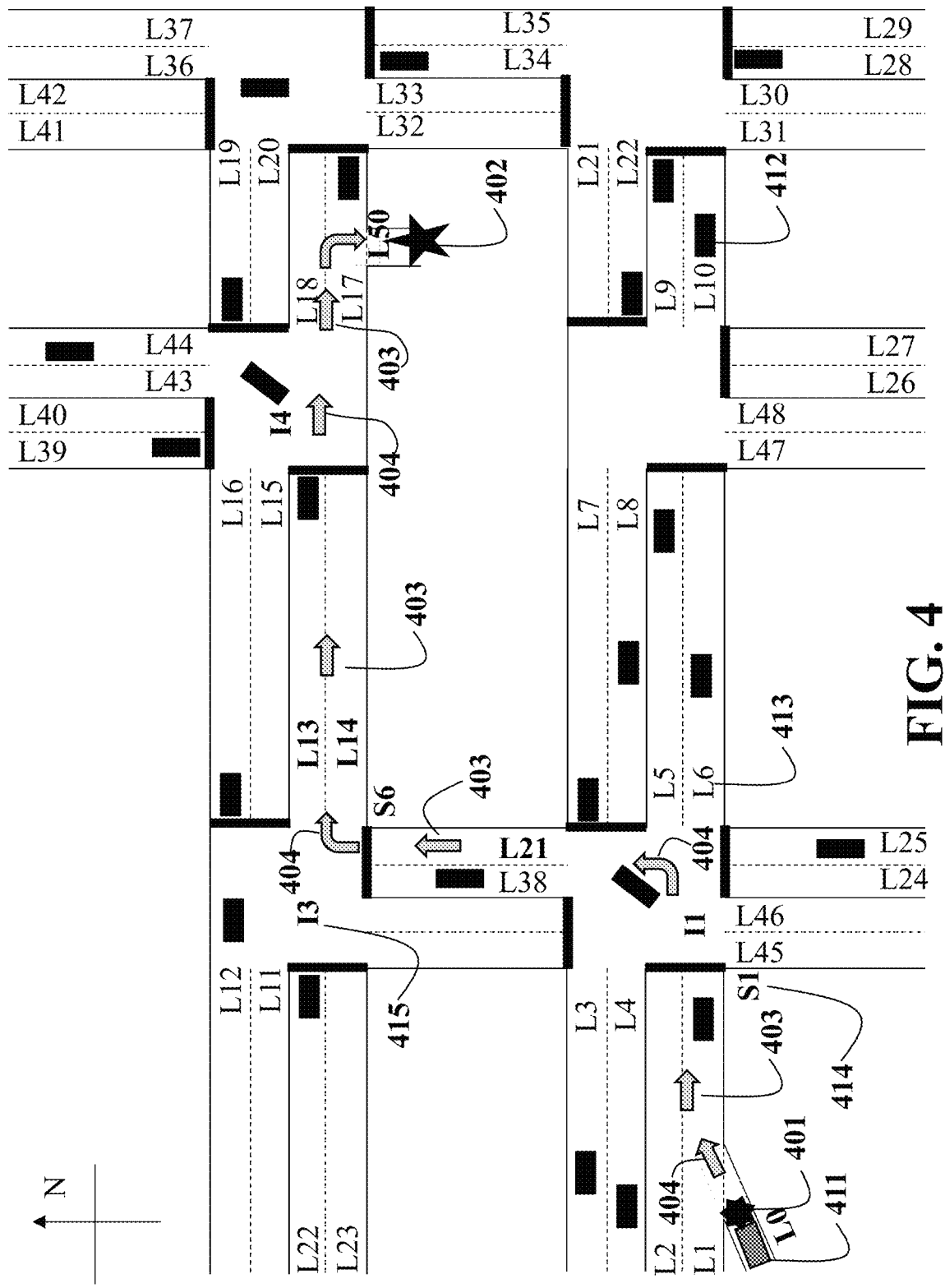
FIG. 4 illustrates a description of the routing information as used in some embodiments of the present disclosure in an exemplary traffic scene.

FIG. 4 illustrates a description of the routing information as used in some embodiments of the present disclosure in an exemplary traffic scene. For example, FIG. 4 depicts a scenario with the vehicle under control, referred to as ego vehicle 411, with the traffic composed of other vehicles shown similar to 412, lanes marked for instance 413 as L6, stop lines marked for instance 414 as S1, intersections marked for instance 415 as I3. With reference to FIG. 4, for the vehicle in position 401, with final destination 402, the Routing 301 provides the sequence of roads indicated by arrows 403, and the sequence of turns indicated by arrows 404. It should be noted however that the sequence of roads 403 and the sequence of turns 404 does not by itself specify a trajectory or a path for the vehicle. There are a number of discrete decision to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions cannot be taken by the Routing 301 because they depend on the current traffic at the moment when the vehicle reaches the corresponding location, which is in general unknown to the Routing due to the uncertainty of traffic motion and uncertainty of the moment at which the vehicle will reach the location.

The actual trajectory, in terms of sequence of positions and orientations and corresponding time instant, that the vehicle should execute to get to the final destination is usually determined by a planning and control module 303. However, the planning and control 303 of FIG. 3 may not be able to operate based directly on the information provided by Routing 301. In particular, operating discrete and continuous decision in a single step leads to a so-called hybrid decision problem, which based on experimentation requires a very large amount of computations. Instead, the computing unit 102 has often limited memory and processing speed, and hence it is beneficial to decompose the problem in a way that makes it computationally tractable, yet it ensures that no inconsistencies are caused by the decomposition. That is, decomposing the overall problem into many simpler sub-problems, solving each single subproblem in sequence, and operating according to the sequential solution of the sub-problems, results in a solution to the overall problem.

Still referring to FIG. 4, another realization of the present disclosure is that one can decompose the problem in terms of discrete decisions and continuous decisions where a Decision Making module 302 of FIG. 3 operates discrete decisions, such as whether to change lane or stay in the current lane, whether to start decelerating to stop at the stop line or not, whether to cross the intersection or not, and converts this into intermediate goals for the Planning and Control module 303 of FIG. 3. The Planning and Control module 303 receives the current intermediate goal and possibly additional parameters for adjusting its computation to the current intermediate goal from the Decision Making module 302, and performs its computation. The planning and control module may inform the decision making module of the achievement of the current intermediate goal, or the impossibility of achieving the current intermediate goal. The goals provided by the Decision Maker should be achievable by the Planning and Control module, according to the current traffic conditions and vehicle conditions, should ensure that the sequence of intermediate goals allows to be interconnected, i.e., the planner can switch from one goal to the next one, and achieving all intermediate goals results in achieving the overall goal, i.e., reaching the final position.

Thus, the Decision Making module 302 of FIG. 3 processes the information from Routing 301 using the map stored in the third section of the memory 213 of FIG. 2 to produce a sequence of goals, and, using information from sensors and communication 104a, 104b selects one or more alternative current goals to provide to the Planning and Control module 303 of FIG. 3, which uses those goals to determine and execute the current trajectory.

Still referring to FIG. 4, it is further realization of this present disclosure that some intermediate goals are specific and some other goals are optional. The road segments indicated by Routing 301 of FIG. 3 determines specific goals, such as specific turns at intersections. However, there are additional specific goals due to the proper operation of the vehicle according to driving rules. For instance, staying stopped at a stop line, and also decelerating to stop at a stop line, is specific according to driving rules. Similarly, to stay on a specific lane at a specific intersection based on the turn to be taken at such intersection may be mandatory. The same can be said as regards being on a specific lane before exiting the general road.

Figure 5:
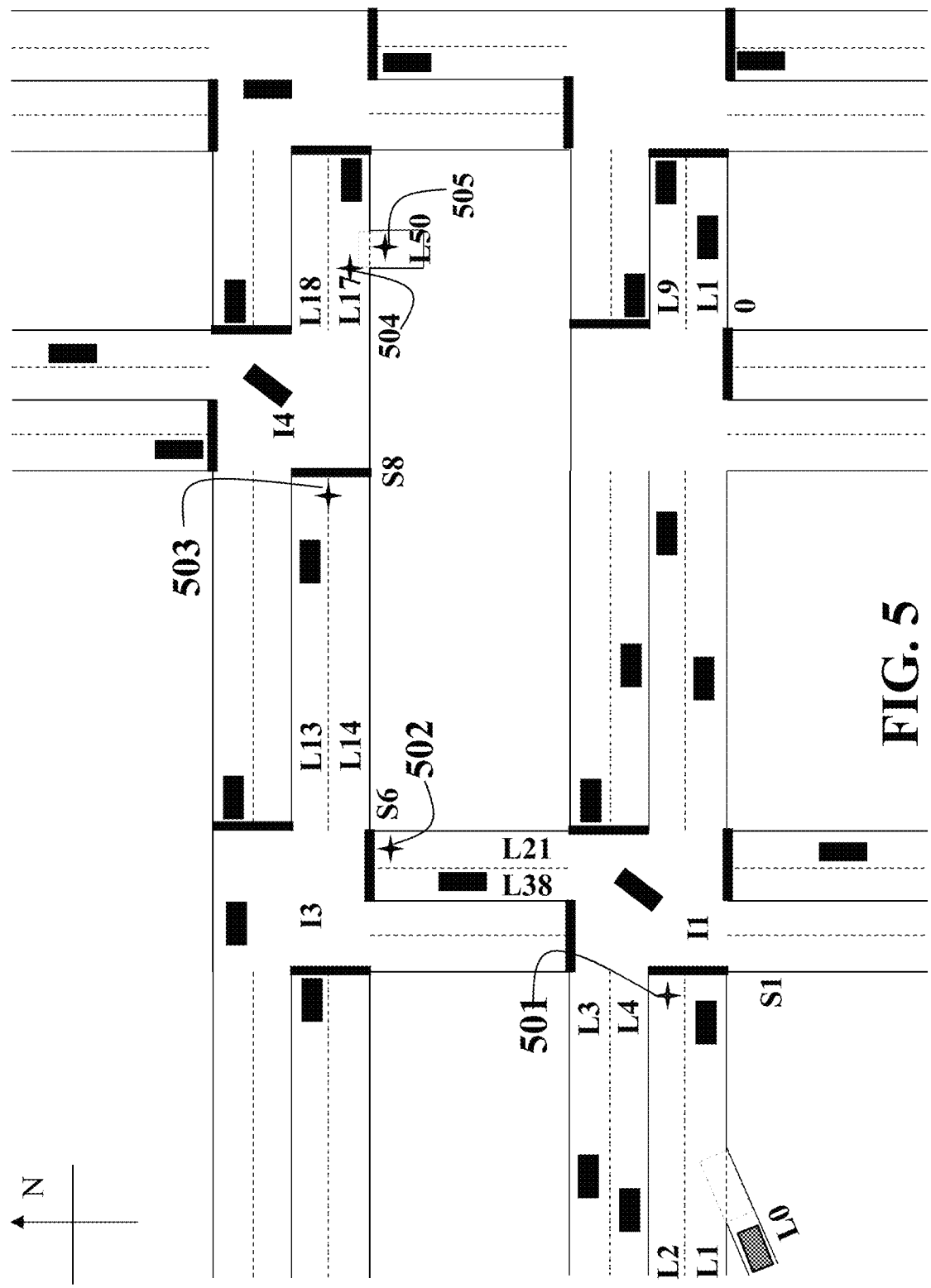
FIG. 5 illustrates a description of the specific intermediate goals as used in some embodiments of the present disclosure in the exemplary traffic scene in FIG. 4.

FIG. 5 illustrates a description of the specific intermediate goals as used in some embodiments of the present disclosure in the exemplary traffic scene in FIG. 4. For example, in FIG. 5, this results in specific intermediate goals 501, 502, 503, which are related to being stopped at a stop line. While specific intermediate goals 501 and 502 require a specific lane, intermediate goal 503 does not. Specific intermediate goal 504 is related to being in a specific lane before exiting the general road, and specific intermediate goal 505 coincides with the final destination, i.e., the final goal.

Figure 6:
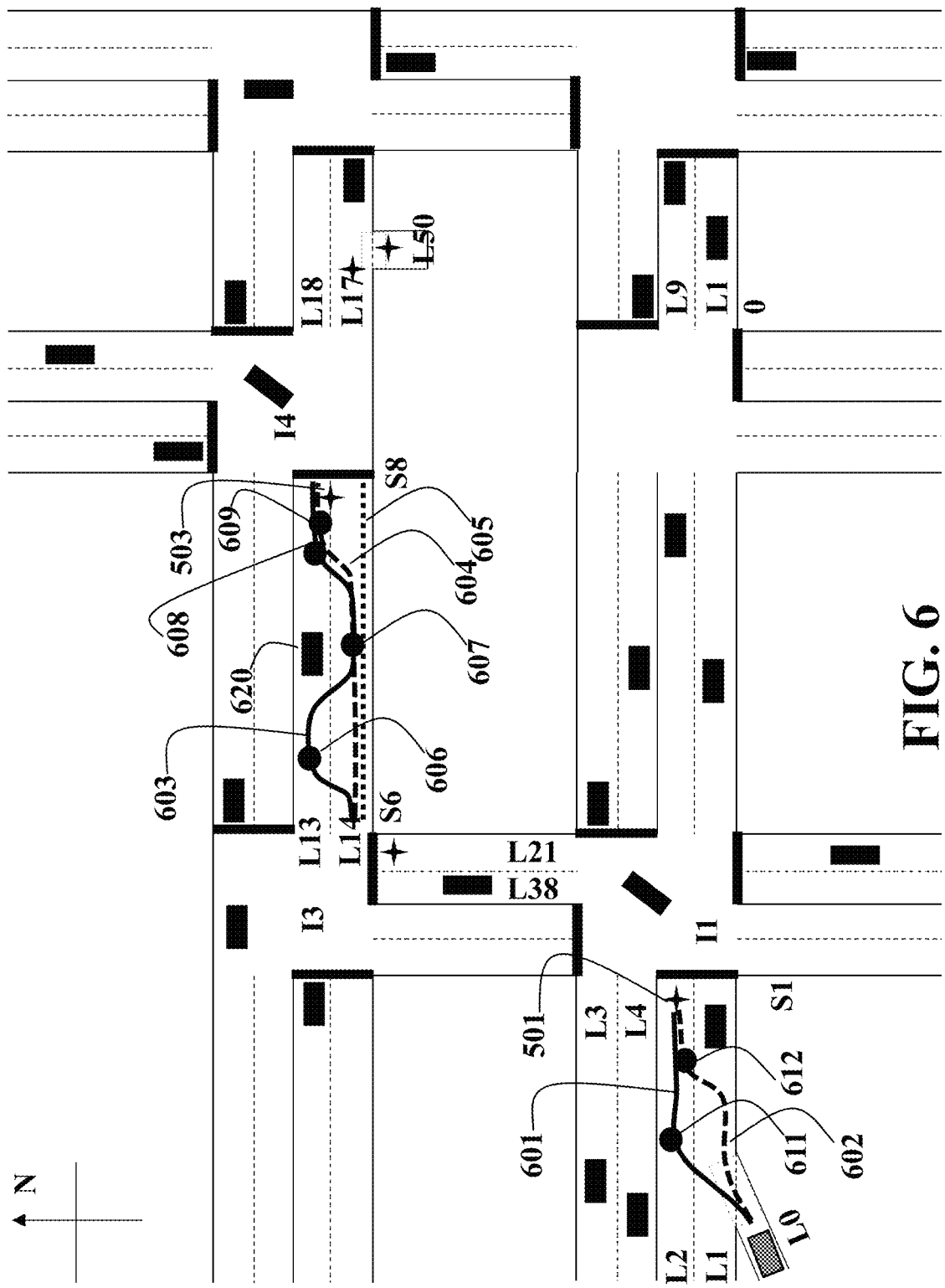
FIG. 6 illustrates a description of the optional goals as used in some embodiments of the present disclosure in the exemplary traffic scene in FIG. 4.

FIG. 6 illustrates a description of the optional intermediate goals as used in some embodiments of the present disclosure in the exemplary traffic scene in FIG. 4. Besides specific intermediate goals, there are a number of intermediate goals that are optional. For instance, in FIG. 6 trajectories 603 and 604 both reach the specific intermediate goal 503, yet trajectory 603 has intermediate goals 606 and 607 that prompt 2 lane changes, while trajectory 604 does not. Both trajectories 603, 604 have intermediate goals 608, 609 of changing lane before the stopline, which is also not required since both lanes are allowed to proceed forward at intersection I4. In fact, trajectory 605 has no intermediate goals and directly reaches the specific goal 503. Also, besides the sequence of intermediate goals, the timing of those can be different, as trajectories 601,602 both have intermediate goals 611, 612 of a lane change to L2, which is necessary due to the specific intermediate goal of stopping in lane L2 at stop line S1 to turn left at intersection I1, yet the location where the intermediate goals 611, 612 are applied are significantly different.

Figure 7:
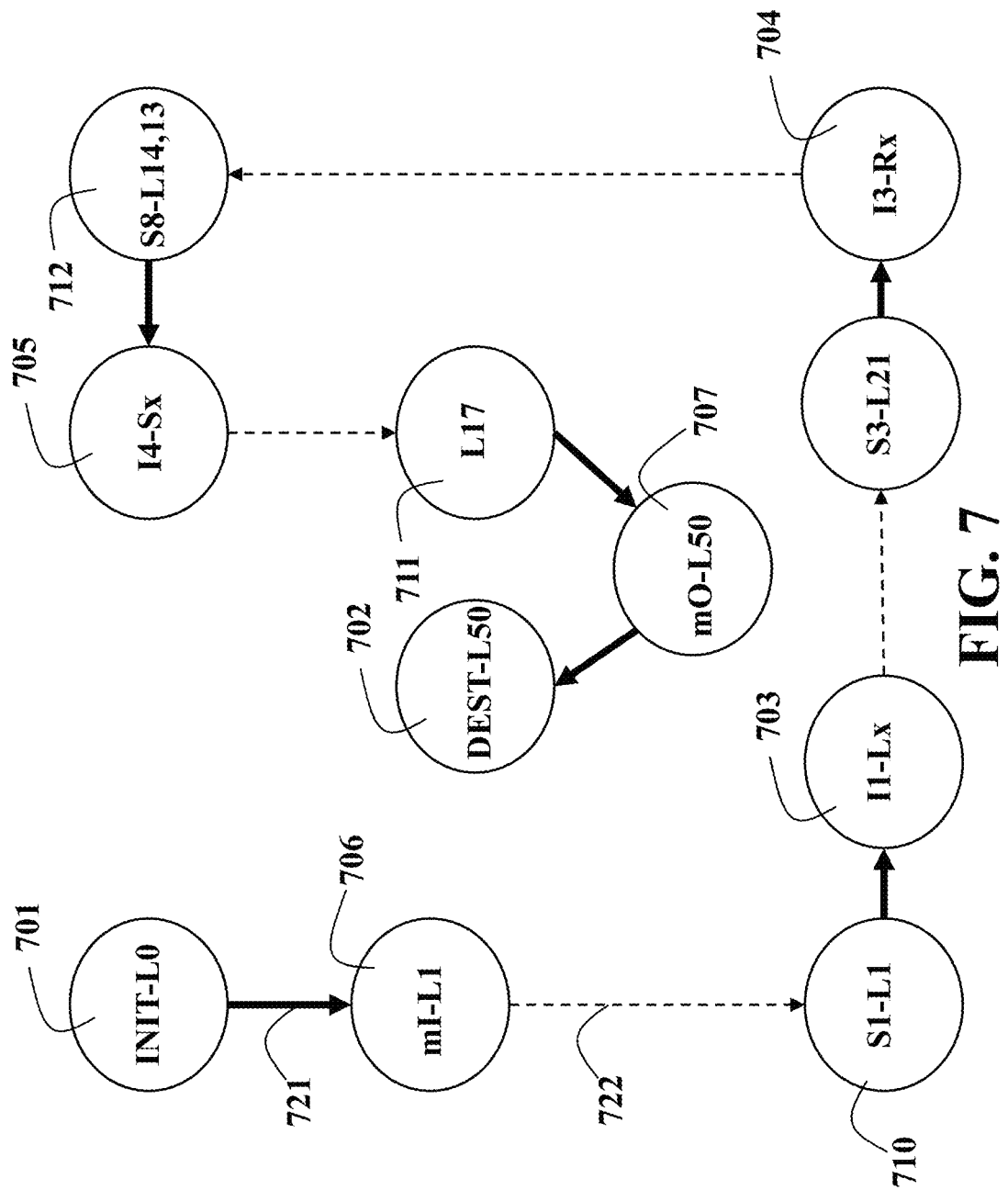
FIG. 7 illustrates a description of the construction of the goal graph from specific goals as used in some embodiments of the present disclosure in the exemplary traffic scene in FIG. 4.

FIG. 7 illustrates a description of the construction of the goal graph from specific goals as used in some embodiments of the present disclosure in the exemplary traffic scene in FIG. 4. For example, in order to select the intermediate goals, the Decision Making module constructs a goal graph as described starting from FIG. 7. First, the sequence of road segments determined from the Routing 301 of FIG. 3 are placed into the graph including initial position 701 and final position 702, for instance by including as graph nodes the goals 703, 704, 705 of traversing intersections and the lanes from which the vehicle must merge out 706 and into which the vehicle must merge in 707. For instance, 703 indicates that the intersection I1 is to be reached and a left turn must be taken, 704 indicates that the intersection I3 is to be reached and a right turn must be taken, 705 indicates that the intersection I4 is to be reached and the vehicle must proceed straight, 706 indicates that initial merge-in is necessary into lane L1, and 707 indicates that merge out is necessary into lane L50.

Then, specific goals are placed into the graph and connected to the goals to the corresponding road segments. For instance, 710 indicates that the vehicle must stop a stop line S1 in lane 1, 712 indicates that the vehicle must stop at stop line S8 in lane 14 or lane 13, 711 indicates that the vehicle must be in lane L17 before merging out. In FIG. 7, a solid line similar 721 denotes that the goals must be done in sequence without any other intermediate goal between the two, while a dashed line similar to 722 indicates that some optional goals may occur in between the two goals. The solid lines similar to 721 specify allowed goal transitions, the dashed lines similar to 722 specify ordering of goals and not necessarily allowed transitions.

Finally, the dashed lines similar to 722 are replaced by including the optional goals, if any, between two specific goals. Albeit possibly large, the total number of goals is always finite, so that the execution of an operation on each goal, or on a specific subset of goals, can be completed in a finite number of steps.

Figure 8:
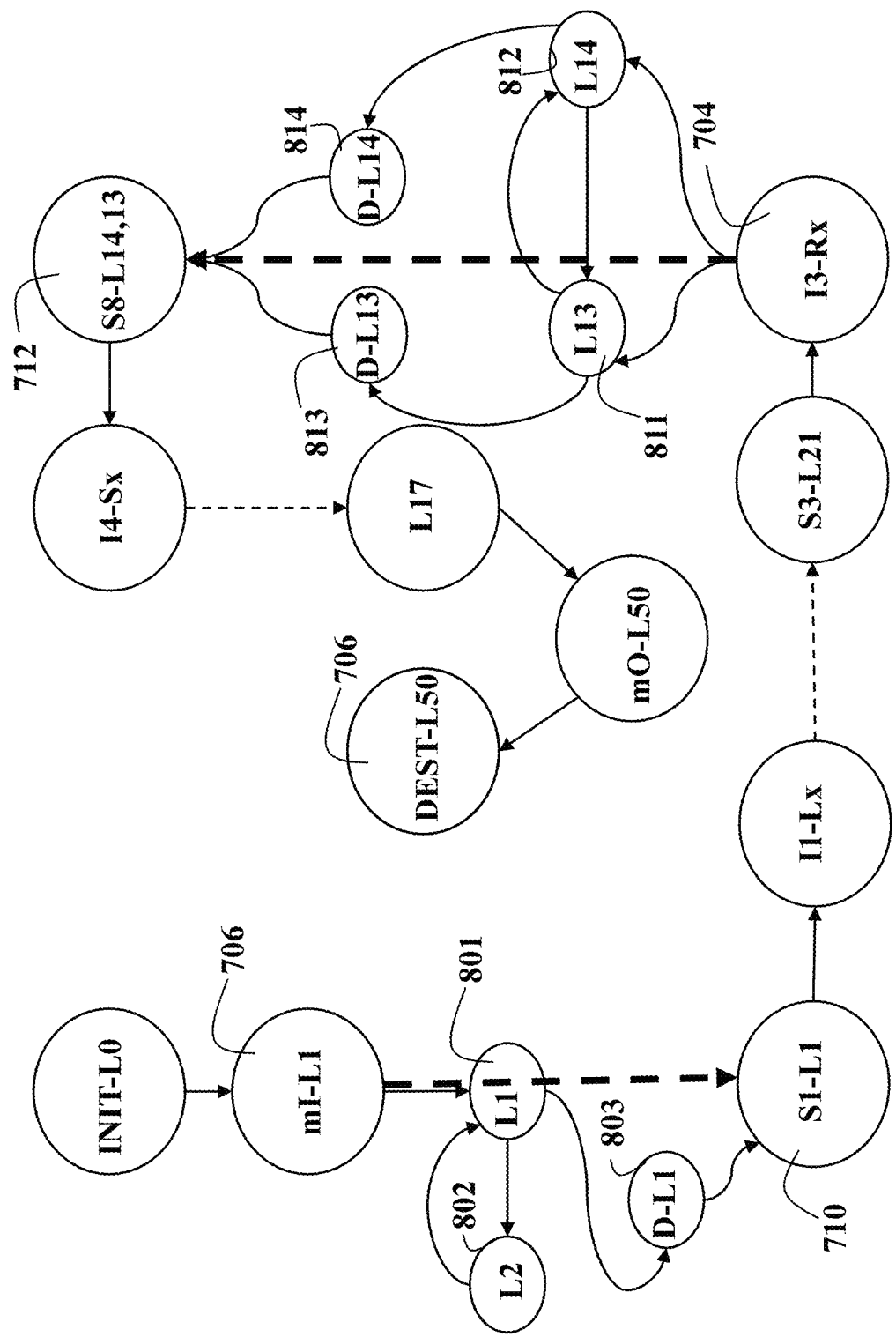
FIG. 8 illustrates a description of the construction of the goal graph by including specific goals as used in some embodiments of the present disclosure for the goal graph described in FIG. 6 in the exemplary traffic scene in FIG. 4.
Figure 9:
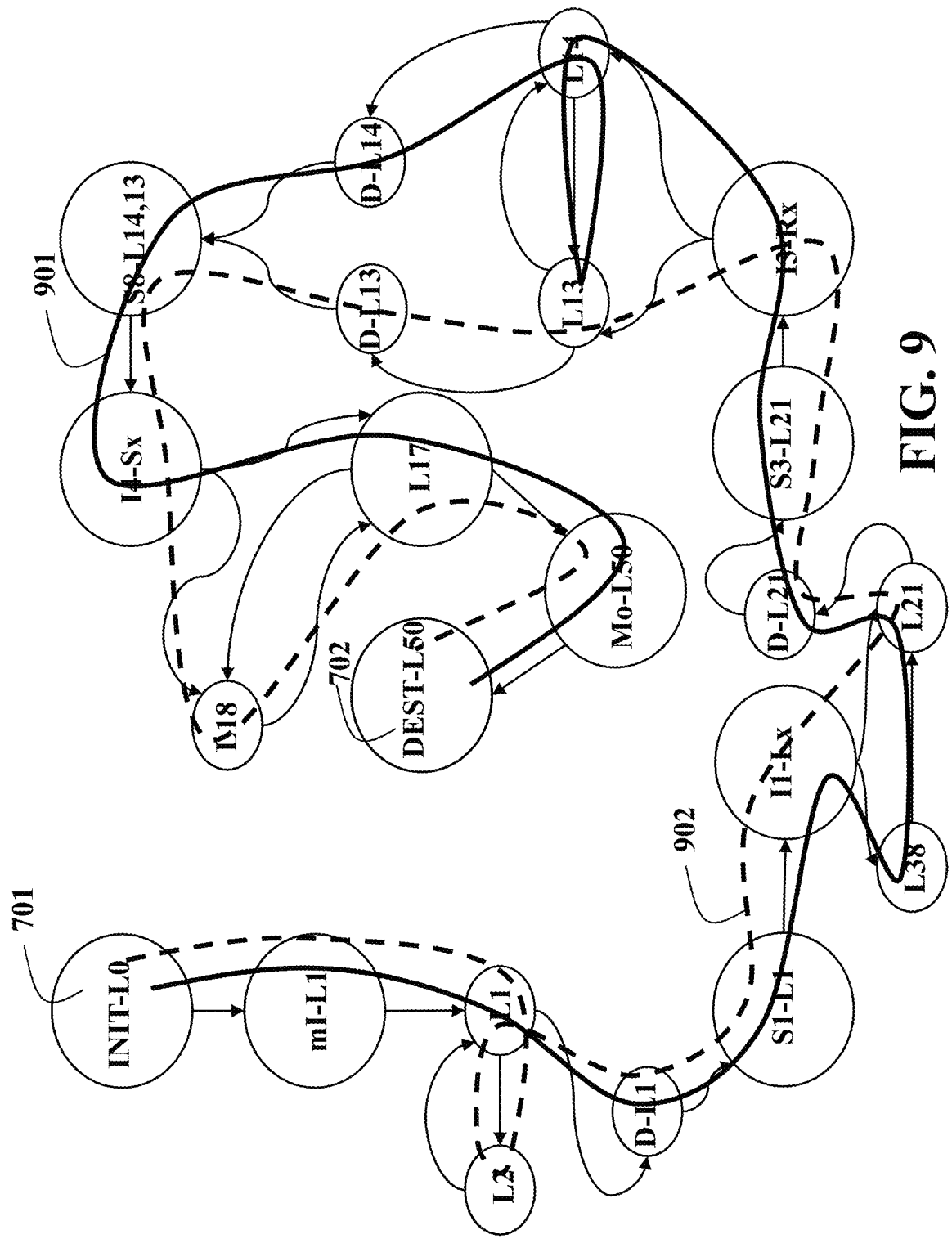
FIG. 9 shows the construction of allowed sequence of goals as used in some embodiments of the present disclosure for the goal graph described in FIG. 7 in the exemplary traffic scene in FIG. 4.

FIG. 8 illustrates a description of the construction of the goal graph by including specific goals as used in some embodiments of the present disclosure for the goal graph described in FIG. 6 in the exemplary traffic scene in FIG. 4. For instance, in FIG. 8 the dashed line connecting 706, 710, is replaced by the intermediate goals of starting 801 in lane L1 and possibly changing lane an undetermined amount of times between lanes L1, 801, and L2, 802, then eventually from L1 start decelerating 803, to reach the mandatary goal 710 of being stopped at stopline S1 in lane L1. Similarly, the dashed line connecting 704, 712, is replaced by the intermediate goals of leaving intersection I3 in either lane L13, 811, or L14, 812, possibly changing lane an undetermined amount of times between lanes L13, 811, and L14, 812, then start decelerating in the current lane, either L13, 813, or L14, 814, to reach the mandatary goal 712 of being stopped at stopline S8 in either lane L13 or L14. By operating such process for every dashed line, eventually the goal graph can be traversed from the goal corresponding to the initial vehicle position to the goal corresponding to the desired final position crossing only solid lines. There are multiple paths in the graph that go from the initial node 701 to the final node 702, such as 901, 902, referring to FIG. 9. Decision Making 302 of FIG. 3 selects the actual path by selecting the sequence of intermediate goals. For example, FIG. 9 shows the construction of allowed sequence of goals as used in some embodiments of the present disclosure for the goal graph described in FIG. 7 in the exemplary traffic scene in FIG. 4.

When deciding on the intermediate goal to achieve, the Decision Making 302 of FIG. 3 needs to account for the current traffic. For instance, referring to FIG. 6, along trajectory 603, an intermediate goal 607 of changing lane is dictated by the presence of a slow moving vehicle 620 in the current lane. Also, the decision making needs to account for the current vehicle state, such as vehicle position and velocity and heading of the vehicle.

For instance, in order to achieve the specific goal 501, lane changes goals 611, 612 must be such that the lane changes can be completed in the necessary space considering the current vehicle velocity and steering capabilities. Thus, the Decision Making 302 evaluates what intermediate goals can be achieved based on traffic condition, and the need to achieve the next specific goal, and provides to the Planning and Control 303 one or more goals that are achievable based on the current vehicle and traffic conditions and from which the next specific goal can be achieved. If no intermediate goal satisfies these requirements, Decision Making issues a warning error which enables recovery actions, such as requiring the driver to take control or bringing the vehicle to a safe stop.

Still referring to FIG. 8, the selection of the intermediate goals that are achievable based on the current vehicle and traffic conditions and from which the next specific goal can be achieved is operated based on the goal graph. At any point in time the current intermediate goal indicates the node of the graph that is currently active. From there, Decision Making selects the intermediate goal for the next time period, which results in either keeping the current intermediate goals, and hence the same node of the graph, or changing to a different intermediate goal, among those associated with nodes of the graph that are successors to the node associated to the current goal. For instance, in FIG. 8, for a vehicle that has current intermediate goal of driving on lane L1, and hence is in node 801 in the goal graph, Decision Making may select to keep driving in lane L1, 801, or to change lane to L2, 802, or to start decelerating in lane L1, 803. But it cannot directly stop at stopline S1, in lane L1, 710, because there is no allowed goal transition from 801 to 710.

Based on the graph, multiple choices of intermediate goal for the next period may be possible. Hence the goal transitions are non-deterministic, i.e., they are not uniquely specified by the goal graph. However, additional information needs to be considered, including the vehicle information and the traffic information, and the achievement of the next specific goal. Then, each goal is associated with vehicle and traffic conditions that make it achievable.

The vehicle conditions determine a region in the state space of the vehicle, based on the vehicle characteristics such as maximum steering, steering rate, acceleration, etc, wherein the vehicle conditions and the first vehicle model are stored in the first section 211 of the memory. If at the current time, and for a current intermediate goal, the current vehicle state is inside the region of another intermediate goal for which transition is allowed based on the goal graph, then such goal can be achieved and the Decision Maker can select it as intermediate goal for the next time period.

Figure 10:
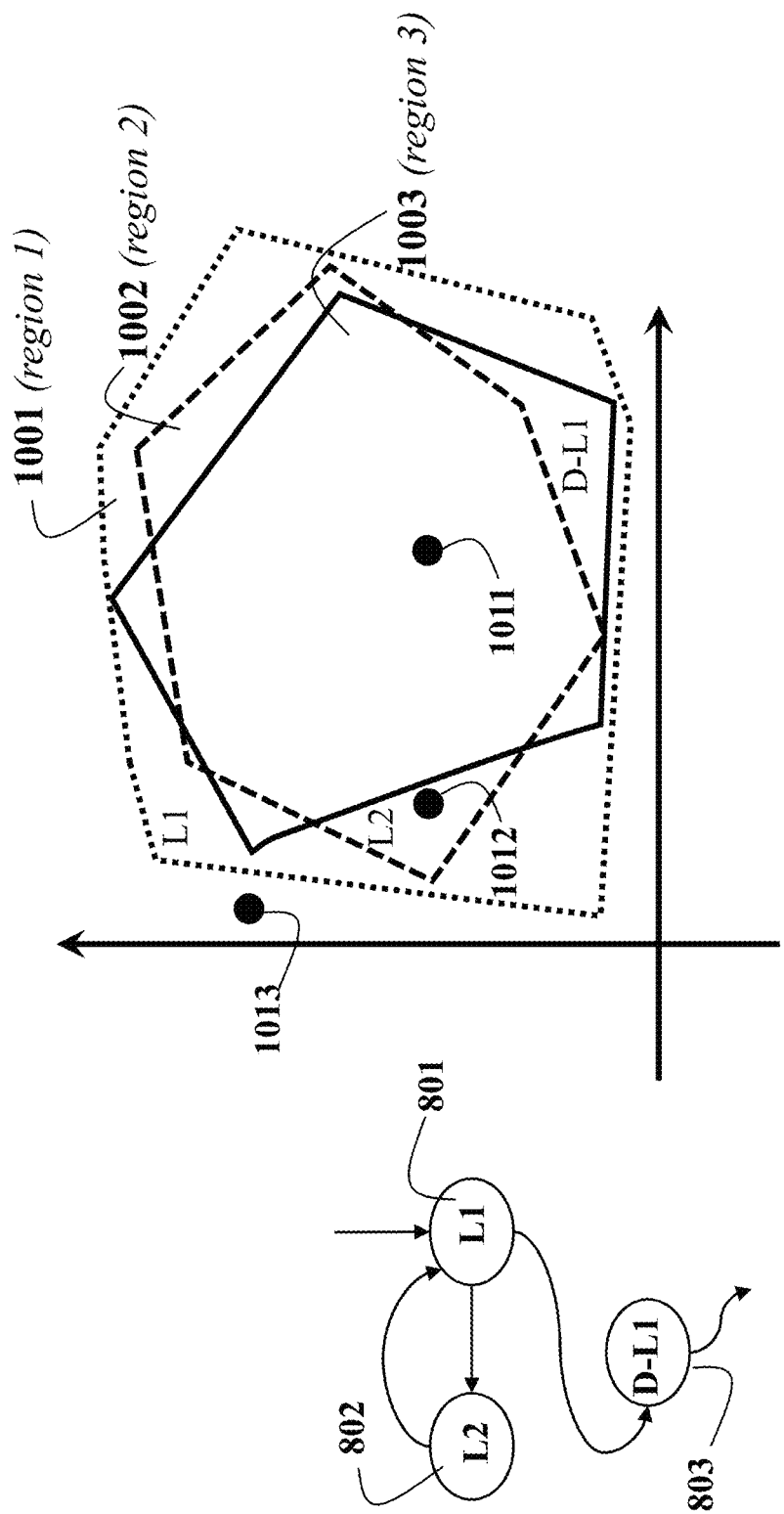
FIG. 10 illustrates using regions of states of a model of the vehicle motion for selecting the next allowed goal based on the current goal in the goal graph as used in some embodiments of the present disclosure.

FIG. 10 illustrates using regions of states of a model of the vehicle motion for selecting the next allowed goal based on the current goal in the goal graph as used in some embodiments of the present disclosure. For instance, in FIG. 10, the goal 801 of lane L1, of 802 lane L2, and of 803 decelerating in lane L1 may be associated to the three regions 1001, 1002, 1003. If the vehicle state is 1011, then any of the three goals can be selected as next intermediate goal, while if the vehicle state is 1012, only 801, 802 can be chosen as next intermediate goal. If the vehicle state is 1013, none of the goals is allowed, and the warning error is issued.

The need to achieve the next intermediate specific goal has a similar effect. First, a region of the vehicle state space is associated to it being the region of vehicle states from which the next intermediate specific goal can be achieved according to the first vehicle model stored in the first section 211 of the memory. Then, for any graph node that is allowed to transition to the graph node corresponding to the next intermediate specific goal, the region of vehicle states that allow to achieve the intermediate goal and also enter the region of states from which the next specific goal is achieved, according to the first vehicle model stored in the first section 211 of the memory, is computed. The process can be repeated iteratively by obtaining for any graph node that is successor of the graph node associated to the current intermediate goal a region of vehicle states such that transitioning to the goal associated with the successor node allows for a sequence of intermediate goals leading to accomplishment of the next intermediate specific goal.

Figure 11:
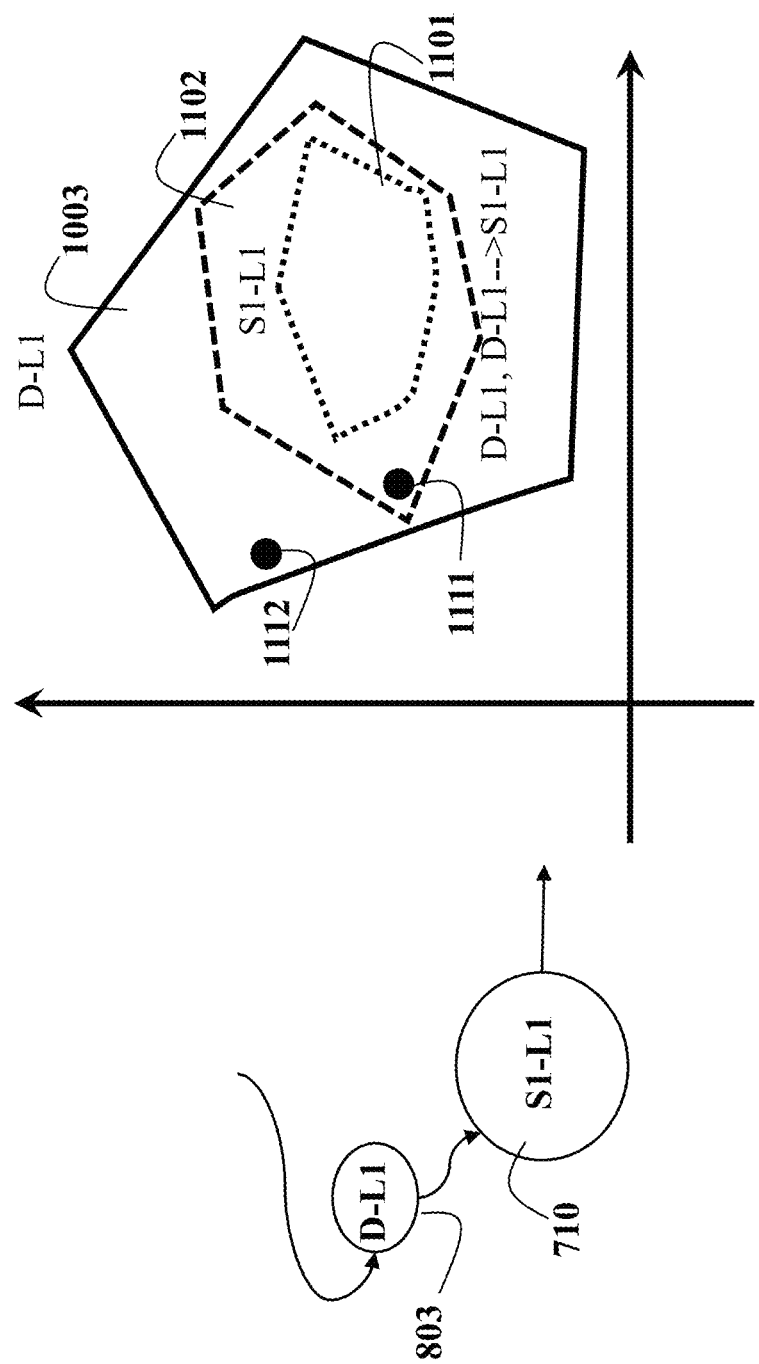
FIG. 11 illustrates using regions of states of a model of the vehicle motion for selecting the next allowed goal based on the next specific goal in the goal graph as used in some embodiments of the present disclosure.

FIG. 11 illustrates using regions of states of a model of the vehicle motion for selecting the next allowed goal based on the next specific goal in the goal graph as used in some embodiments of the present disclosure. For instance, in FIG. 11, the goal 803 of decelerating in lane L1 may be associated to the region 1003. However, considering the additional requirement of entering the region 1101 where the goal 710 of stopping at stopline S in lane L1 can be achieved, the region where both conditions are satisfied is 1102, which is smaller than 1003. Thus, if the vehicle state is 1111, then 803 can be chosen as next goal and it is possible to eventually enter into the region where 710 is chosen as goal, while if the vehicle state is 1112, the latter is not possible, and hence transitioning to goal 803 should not be currently done.

The avoidance of collisions and other dangerous interactions with traffic further reduces the size of the region that allows selecting a goal as the next intermediate goal. For instance, due to other vehicle occupying part of an adjacent lane the transition from lane L1 to lane L2 may not be possible in the entire region of the vehicle state space that allows the maneuver to be completed correctly, in the absence of traffic. The reduced region of vehicle states can be obtained by removing from the region of vehicle states to which the next goal can be accomplished according to the first vehicle model stored in the first section 211 of the memory, the region of vehicle states that necessarily result in collision or dangerous interactions with other vehicles according to the first traffic motion model stored in the fourth section 214 of the memory.

Figure 12:
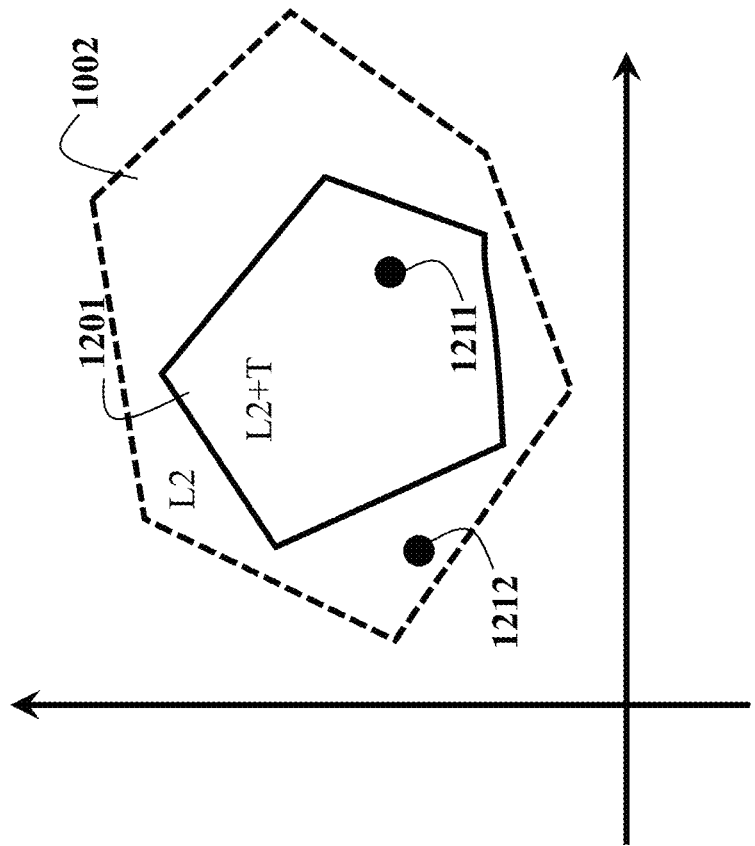
FIG. 12 illustrates using regions of states of a model of the vehicle motion for selecting the next allowed goal based on the current traffic situation and according to a model of the traffic as used in some embodiments of the present disclosure.
Figure 12:
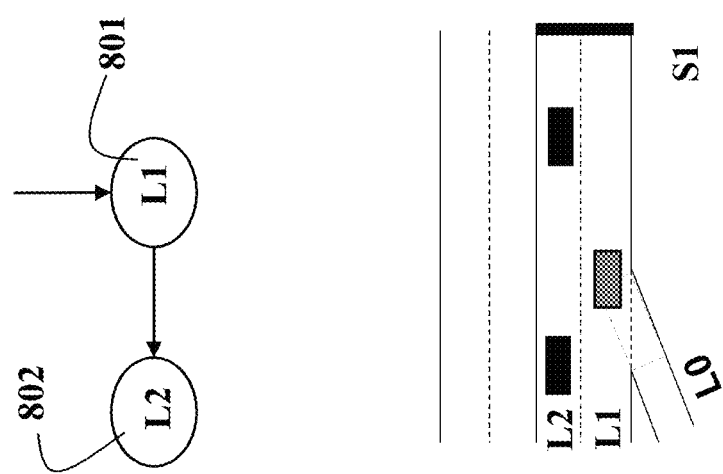

FIG. 12 illustrates using regions of states of a model of the vehicle motion for selecting the next allowed goal based on the current traffic situation and according to a model of the traffic as used in some embodiments of the present disclosure. For instance, in FIG. 12, the goal 802 of lane L2 may be associated to the region 1002. However, considering the additional requirement of avoiding collision or dangerous interactions with traffic results in a smaller region 1201 where both condition are satisfied. Thus, if the vehicle state is 1211, then 801 can be chosen as next goal and it is possible to avoid collision or dangerous interactions with, while if the vehicle state is 1212, the latter is not possible, and hence transitioning to goal 802 should not be currently done.

By considering only the region of states from which the goal can be accomplished, and the next specific goal can be accomplished, and the collision or dangerous interactions with the traffic are avoided, one obtains the region of states from which currently one can transition to the goal. If the current vehicle state is contained in such region, then the goal can be selected as intermediate goal for the next period.

Thus, based on such selection, the Decision Making 302 of FIG. 3 determines one or more goals that are allowed to be next intermediate goals and provide them to the Planning and Control module 303.

Upon receiving one or more current goals, the Motion Planning sub-module 304 within the Planning and Control module 303 of FIG. 3 attempts to compute a trajectory for each goal and selects the current best trajectory among all those that are successfully computed, according to a numerical value determined by a cost function including at least one specified criterion. The specified criterion may be different for different goals.

Figure 13:
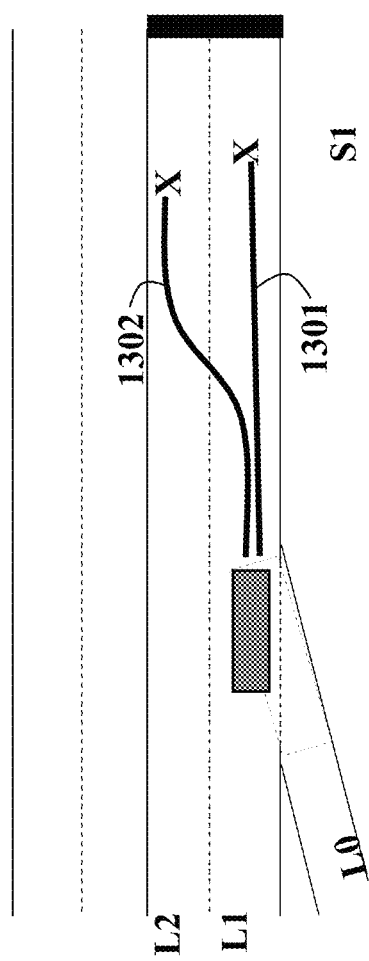
FIG. 13 illustrates trajectories computing according to different allowed goals as used in some embodiments of the present disclosure.

FIG. 13 illustrates trajectories computing according to different allowed goals as used in some embodiments of the present disclosure. For instance, in FIG. 13, for vehicle state 1012, both goals 801 lane L1 and 802 lane L2 are possible according to vehicle state regions 1001, 1002. Then Decision Making issues the goals 801, 802 to Motion Planning sub-module, which computes trajectories 1301, 1302 corresponding to modes 801, 802, respectively. Since both two trajectories are computed, the Path Planning module compares them. For instance, it evaluates that 1301 reaches further head on the current road segment, but 1302 is already in the position required for the upcoming left turn. Thus, for instance trajectory 1302 is chosen.

After the current best trajectory has been selected, the Vehicle Control sub-module 305 determines commands of the vehicle actuators, such as steering, acceleration, deceleration, that modify the vehicle behavior so that the vehicle achieves an actual trajectory as close as possible to the current best trajectory, as noted earlier. The commands to the vehicle actuators are then received by the Actuator Control sub-module 306 that modifies the control signals to the actuators, such as electric motor voltage, throttle opening, brake pads pressure, to achieve the desired vehicle commands, as noted earlier.

Figure 14A:
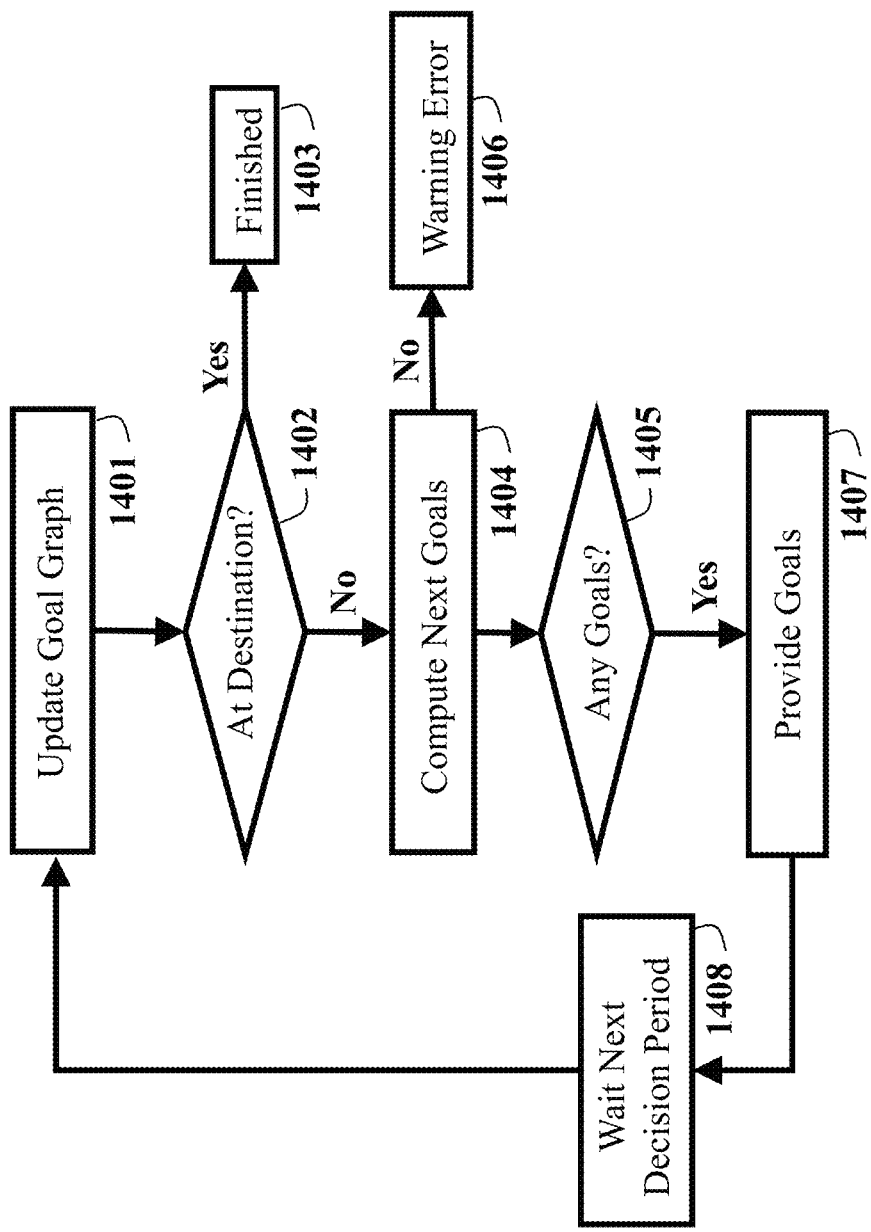
FIG. 14A illustrates a block diagram summarizing an operation of the decision making module of a vehicle control method according to some embodiments of the present disclosure.

FIG. 14A illustrates a block diagram summarizing an operation of the decision making module of a vehicle control method according to some embodiments of the present disclosure. First, the goal graph is updated 1401 based on specific and optional goals. Then, the check 1402 is performed whether the destination goal has been reached based on the current state of the first model of motion of the vehicle, and if that is positive, the system has finished 1403 its operation. Otherwise, the next admissible goals are computed 1404, and the check 1405 is performed if any goal is admissible based on the current state of the first model of motion of the vehicle. In negative case, a warning error is issued 1406 that normal operation cannot continue. Otherwise the admissible goals are provided 1407 to the planning and control module 303, and the Decision making module waits 1408 for the beginning of the next period of operation. Such period can begin after a fixed amount of time, in the case of periodic operation, or after a signal is received from the planning and control module, for instance indicating the completion of one or more of the admissible goals, or the impossibility to achieve any goal. A combination of periodic and aperiodic operation is also possible, period can begin after a fixed amount of time but it can begin sooner than normal, if requested by the motion planner.

Figure 14B:
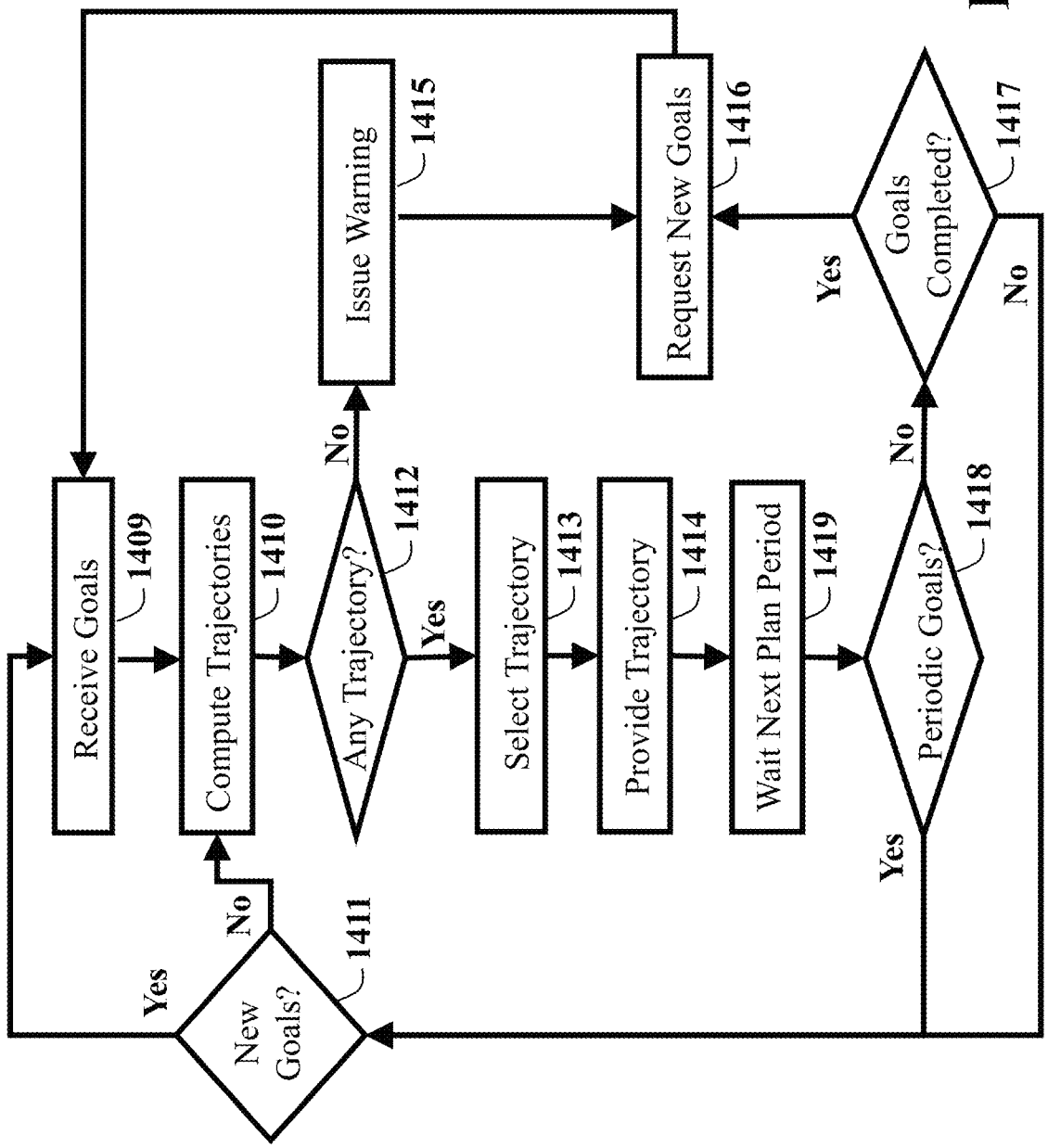
FIG. 14B illustrates an operation of the motion planning submodule of the planning and control module in the control unit according to some embodiments of the present disclosure.

FIG. 14B describes the operation of the motion planning submodule of the planning and control module in the control unit according to some embodiments of the present disclosure. The motion planning module receives 1409 one or more allowed goals from the decision making module and tries to compute 1410 one trajectory per each received allowed goal based on the current state of the second model of motion of the vehicle. Then, the motion planning checks 1412 if any trajectory for any goal could be computed. In negative case, a warning error is issued 1415 that normal operation cannot continue and new goals are requested 1416. Otherwise, one of the trajectories that have been computed is selected as current trajectory, 1413, and the trajectory is provided 1414 to the vehicle control submodule 305, and the motion planned waits 1419 until the beginning of the next motion planning period, which is determined by a fixed interval and larger than the period of the decision making, when the period of the decision making is also fixed. Then, if 1418 the goals are computed periodically, the motion planning checks if new goals have been computed. If so, the motion planning receives the new goals 1409, otherwise, the motion planning proceeds with the old goals. If the goals are not computed periodically, but requested from the motion planner, for instance due to having achieved one or more of the current goals, then if 1417 at least one current goal has been completed, then new goals are requested, 1406, otherwise the motion planner still checks if 1411 new goals are provided by the decision making module.

Figure 15:
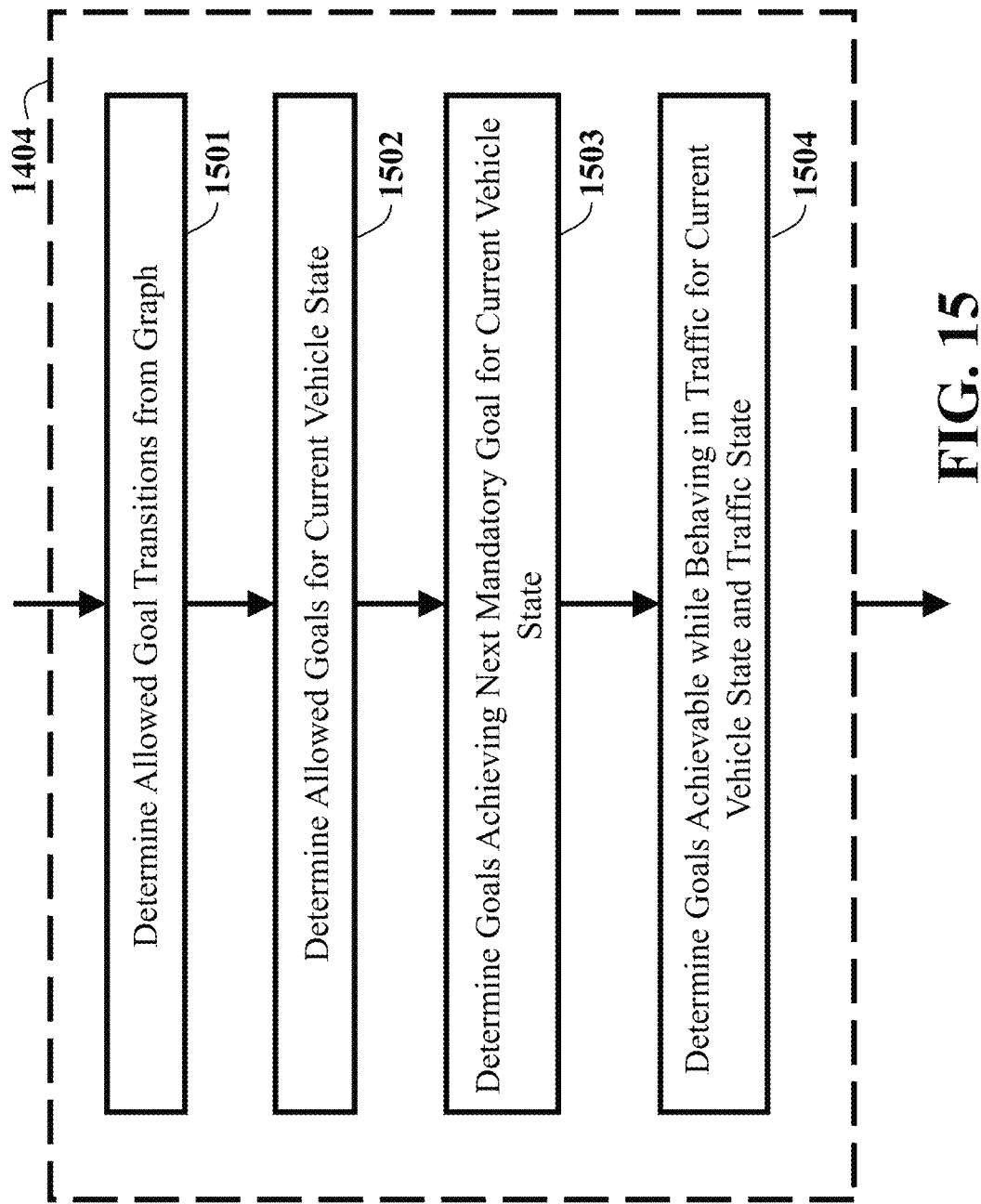
FIG. 15 illustrates a block diagram summarizing the steps for selecting the next goal according to some embodiments of the present disclosure for the block diagram shown in FIG. 14A and FIG. 14B.

FIG. 15 illustrates a block diagram summarizing the steps for selecting the next goal according to some embodiments of the present disclosure for the block diagram shown in FIG. 14A and FIG. 14B. For example, FIG. 15 details the step of the computation of the next admissible goals, 1404. First the allowed transition for the goal graph are determined 1501. Based on those, the allowed goals are for current vehicle states are determined 1502, and among those, the goals achieving next specific goal for current vehicle state are selected 1503. Finally, among those, the goals achievable while behaving in traffic are selected as allowed next goals.

Models of Vehicle Motion

A model of the vehicle motion is a set of equations describing the evolution of the vehicle model state based on vehicle model inputs u, d, and vehicle model state x, $$x(t+1)=f(x(t),u(t),w(t)) \quad (1)$$

In vehicle model (1), t is a time step index, that is, a counter of sampling periods, each of duration $T_s$. Vehicle model inputs are divided into control inputs u and disturbance inputs d. The control inputs u are quantities that can be chosen from a control algorithm and actuated through appropriate actuators, such as acceleration, torque, steering angle and angular rate, and that modify the behavior of the vehicle. The disturbance inputs d are quantities that depend on the environment surrounding the vehicle, such as road grade, friction, wind force, and hence cannot be chosen by the control algorithm, but still affect the future behavior of the vehicle. A vehicle model state x is a set of quantities, such as position and velocity vectors, angular orientations, and angular rates, such that the knowledge of the state at the beginning of a time interval, together with the knowledge of inputs to the vehicle model during the time interval, entirely and uniquely describes the evolution of the vehicle model state during such time interval.

Different models of vehicle motion can be used for different purposes. Once the inputs to the vehicle model are fixed, vehicle models with different amount of states can be used, where a larger amount of states implies that the model represents in more details the vehicle behavior, but also that the vehicle model is defined by a larger number of equations, and possibly more complicated equations. Thus, vehicle models with more states are more precise, but they require more computations.

Vehicle models are used in the control unit 102 to predict the impact of taking certain decisions and applying certain inputs on the vehicle behavior.

However, different layers in the control unit 102 requires predicting more or less farther in the future and more or less precisely, so that models with different precision can be applied to different layers in 102. In particular, in the first section 211 of the memory 202, a first model of the vehicle motion and a second model of the vehicle motion are stored, to be used in the decision making 303 and in Planning and Control 304.

In addition, models of vehicle motion are used to predict the motion of the traffic around the vehicle under control.

First Model of the Vehicle Motion

The first model of vehicle motion $$x_1(t+1)=f_1(x_1(t),u_1(t),w(t)) \quad (2)$$

is used in Decision Making 303 to select which intermediate goals can be achieved by the vehicle and when the transition to the next specific goal is to be performed. This model is lower order and has fewer parameters than the second model of the vehicle motion, because it needs to predict longer in the future and hence it is necessary that it makes fewer calculations.

For instance, some embodiments of this present disclosure use as first model of the vehicle motion (2) the unicycle model which has state $x_1=(p_x, p_y, v, \theta)$, where $(p_x, p_y)$ is the position vector with respect to a non-moving Cartesian coordinate frame, v is the speed, and $\theta$ is the heading, input $u_1=(u_v, u_\theta)$ where is the acceleration and is the change in heading, and disturbance $w=(w_1, w_2, w_3, w_4)$ representing lumped external disturbances and modeling errors on the corresponding equations, $$p_x(t+1)=p_x(t)+T_s^{(1)}v(t)\cos(\theta(t))+w_1(t)$$

$$p_y(t+1)=p_y(t)+T_s^{(1)}v(t)\sin(\theta(t))+w_2(t)$$

$$v(t+1)=v(t)+T_s^{(1)}u_v(t)+w_3(t)$$

$$\theta(t+1)=\theta(t)+T_s^{(1)}u_\theta(t)+w_4(t) \quad (3)$$

where $T_s^{(1)}$ is the sampling period of the first model of the vehicle motion.

Second Model of the Vehicle Motion

The second model of vehicle motion $$x_2(t+1)=f_2(x_2(t),u_2(t),w(t)) \quad (4)$$

is used in the Motion Planning sub-module 304 to compute the vehicle trajectory that actually achieves the goal determined by Decision Making 303. Since the trajectory computed by the Motion Planning sub-module 304 must actually be executed by the vehicle in order to achieve the goal, the model of vehicle motion used by the Motion Planning sub-module 304 needs to be more precise, and hence has higher order, more parameters and possibly more complicated equations. However, since the prediction of the Motion Planning sub-module 304 is usually shorter than the one of the decision making, the higher order model is still feasible in terms of computations required.

For instance, some embodiments of this present disclosure use as second model of the vehicle motion (4) the kinematic bicycle model which has state $x_1=(p_x, p_y, v, \theta, \delta)$, where $(p_x, p_y)$ is the position vector with respect to the non-moving Cartesian coordinate frame, $v_x$ is the longitudinal component of the velocity vector, $\theta$ is the heading, and $\delta$ is the steering angle, input $u_2=(u_v, u_\delta)$ where is the acceleration and is the change in steering angle, $$p_x(t+1) = p_x(t) + T_s^{(2)} v_x(t) \frac{\cos(\psi(t) + \beta(t))}{\cos(\beta(t))} \quad (5)$$

$$p_y(t+1) = p_y(t) + T_s^{(2)} v_x \frac{\sin(\psi(t) + \beta(t))}{\cos(\beta(t))}$$

$$\theta(t+1) = \theta(t) + T_s^{(2)} v_x(t) \frac{\tan(\delta(t))}{L}$$

$$v_x(t+1) = v_x(t) + T_s^{(2)} u_v$$

$$\delta(t+1) = \delta(t) + T_s^{(2)} u_\delta$$

where L is the wheel base, $L=l_f+l_r$, $l_f$ and $l_r$ are the front and rear axles distances from the vehicle center of mass, $\beta=\arctan(l_r \tan(\delta)/L)$ is the body-slip angle, and $T_s^{(2)}$ is the sampling period of the second model of the vehicle motion where in general $T_s^{(2)} < T_s^{(1)}$.

Constraints on Inputs of Models of Vehicle Motion

For correctly computing the vehicle trajectories constraints on the states and inputs of the vehicle models have to be accounted for. Such constraints are determined by the allowed range of actuators, such as minimum and maximum steering angle, angular rate, acceleration and braking, legal and safety requirements, such as minimum and maximum velocity. The constraints result in bounds to the state and input vectors for the first model $$x_1 \in X_1 \quad (6a)$$

$$u_1 \in U_1 \quad (6b)$$

and for the second model $$x_2 \in X_2 \quad (7a)$$

$$u_2 \in U_2 \quad (7b)$$

Which should be satisfied by the decision and planning algorithms operating on the models.

Matching of First and Second Vehicle Model

In some embodiments of this present disclosure the disturbance w is used to ensure that once a trajectory of the state of the first model of vehicle motion (2) that satisfies the constraints (6a), (6b) is found for achieving a goal, there exists a trajectory of the state of the second model of vehicle motion (4) that satisfies the constraints (7a), (7b) is found that achieves the same goal.

To this end one can design a set W such that for all states of the second model of the vehicle motion $x_2$ that satisfies (7a) and all inputs $u_1$ that satisfy (6b) there exists a vector w in the set W and an input $u_2$ that satisfy (7b) such that $$f_1(T_1(x_2), u_1, w) = f_2(x_2, u_2) \quad (8)$$

where $T_1$ is a pre-defined transformation that associate a state of the first model of the vehicle motion that satisfies (6a) to a state of the second model of the vehicle motion that satisfies (7a). An example for $T_1$ is the projection operator on a specific subspace of the space of $x_2$.

Traffic Models

In some embodiments of the present disclosure, Decision Making 302 and Planning and Control 303 use a first model of traffic motion and a second model of traffic motion stored in the first section 211 of the memory 202 to predict the future behavior of other vehicles present in the road, where the first model of the traffic motion is simpler to evaluate, in terms of computations, than the second model of the traffic motion.

The state of a traffic according to the first and second model of traffic motion $x_{t1}$, $x_{t2}$ is obtained by combining the states of all traffic vehicles on the road in the area where the vehicle under control is currently located $$x_{ti} = (x_{ti}^{(1)}, \ldots, x_{ti}^{(NT)}), i=1,2 \quad (9)$$

where, for instance, $x_{t1}^{(1)}$ is the state of the first traffic vehicle according to the first model of the traffic motion, and $N_T$ is the number of total vehicles in traffic. The first model of the traffic motion describes the motion of each vehicle in traffic according to a first equation $$x_{t1}^{(i)}(t+1) = f_{t1}(x_{t1}^{(i)}(t), u_{t1}^{(i)}(t), w_{t1}^{(i)}(t)) \quad (10)$$

where $u_{t1}^{(i)}$, $w_{t1}^{(i)}$ are the input and disturbance to the i-th vehicle in the traffic according to the first model of the traffic motion.

The first model of the traffic motion describes the motion of each vehicle in traffic according to a first equation $$x_{t2}^{(i)}(t+1) = f_{t1}(x_{t2}^{(i)}(t), u_{t2}^{(i)}(t), w_{t2}^{(i)}(t)) \quad (11)$$

where $u_{t2}^{(i)}$, $w_{t2}^{(i)}$ are the input and disturbance to the i-th vehicle in the traffic according to the second model of the traffic motion.

The control unit 102 receives information about the traffic state from sensors and communication 104a, 104b. The equations (10), (11) can be specified by any standard vehicle model such as the unicycle model (2) or the kinematic bicycle model (4)

Computation of Allowed Intermediate Goals

Achievement of Goal

The Decision Making module 302 processes the information from the Routing module 301 using the static map stored in the third section of the memory 213 to produce a sequence of goals, and it selects one or more alternative current goals to provide to the Planning and Control module 303, which uses those goals to determine and execute the current trajectory, by using information from sensors and communication 104a, 104b. A goal $q_i$ is associated with a set of states of the first model of the vehicle motion (2), denoted by $$\mathcal{G}(q_i) \subset X_1 \quad (12)$$

called the goal set of the goal $q_i$. Whenever the state of the first model of the vehicle motion (2) is inside the goal set $\mathcal{G}(q_i)$, the goal $q_i$ has been achieved. For instance, if $q_i$ is the goal 801 of lane L1, then the corresponding goal set $\mathcal{G}(q_i)$ is the set of states around the center line of lane L1. If $q_i$ is the goal 710 of stopping at stop line S1 in lane L1, then the corresponding goal set $\mathcal{G}(q_i)$ is zero speed at stop line S1 in lane L1.

The vehicle conditions, as stated earlier, determine a region in the state space of the vehicle, based on the vehicle characteristics such as maximum steering, steering rate, acceleration, etc, wherein the vehicle conditions and the first vehicle model are stored in the first section 211 of the memory. If at the current time, and for a current intermediate goal, the current vehicle state is inside the region of another intermediate goal for which transition is allowed based on the goal graph, then such goal can be achieved and the Decision Maker can select it as intermediate goal for the next time period. For instance, in FIG. 10, the goal 801 of lane L1, of 802 lane L2, and of 803 decelerating in lane L1 may be associated to the three regions 1001, 1002, 1003. Such region of an intermediate goal is constructed as a backward reachable set.

Some embodiments of the present disclosure compute a backward reachable set of a goal set and determine whether the current vehicle state is inside $\mathcal{G}$ the set with a limited amount of computations. Given a goal set $\mathcal{G}(q_i)$ the one-step backward reachable set for the first model of the vehicle motion (2) is constructed as $$\text{Pre}(\mathcal{G}(q_i)) = \{X_1 \in X_1 : \exists u_1 \in U_1 \text{ such that } f_1(x_1, u_1, w) \in \mathcal{G}(q_i), \forall w \in W\} \quad (13)$$

The backward reachable set for an arbitrary number of steps is constructed based on the recursion $$\text{Pre}^0(\mathcal{G}(q_i)) = \mathcal{G}(q_i), \quad (14a)$$

$$\text{Pre}^{k+1}(\mathcal{G}(q_i)) = \text{Pre}(\text{Pre}^k(\mathcal{G}(q_i))). \quad (14b)$$

The existence of a sequence of inputs of length n that makes a state of the first model of the vehicle motion $x_1$ reach the goal set $\mathcal{G}(q_i)$ after n steps according to (2) is verified by checking whether the state belongs to the n-steps backward reachable set $$x_1 \in \text{Pre}^n(\mathcal{G}(q_i)). \quad (15)$$

The existance of a sequence of inputs of arbitrary length for which a state of the first model of the vehicle motion $x_1$ reaches the goal set $\mathcal{G}(q_i)$ is verified by checking whether the state belongs to the union of backward reachable sets for any step length $$x_1 \in \bigcup_{k=0}^{\infty} \text{Pre}^k(\mathcal{G}(q_i)). \quad (16)$$

The Decision Making module 302 determines whether a transition from a current goal $q_i$ to another intermediate goal $q_{i+1}$ for which transition is allowed based on the goal graph can be achieved by checking whether the current state of the first model of the vehicle motion $x_1$ is contained in the goal set of a current intermediate goal $q_i$, and whether there exists a sequence of inputs that makes the vehicle state of the first model of the vehicle motion to the goal set of the goal $q_{i+1}$. Specifically, the Decision Making 302 constructs the set being the intersection between the goal set for the current goal $q_i$ and the backward reachable set of any arbitrary number of steps of the goal set $\mathcal{G}^*(q_{i+1})$ of the goal $q_{i+1}$ $$\mathcal{G}^*(q_i) := \mathcal{G}(q_i) \cap \bigcup_{k=0}^{\infty} \text{Pre}^k(\mathcal{G}^*(q_{i+1})), \quad (17)$$

and then checks whether $$x_1 \in \mathcal{G}^*(q_i) \quad (18)$$

Some embodiments are based on realization that the intersection between the current goal set and the union of backward reachable sets of another goal set (17) is more convenient to compute compared to the union of backward reachable sets (16). This is because the current goal set $\mathcal{G}(q_i)$ has a simple structure, most of time focusing on the longitudinal behavior of the first model of the vehicle motion (2). For instance, for lane change from the goal 801 of lane L1 to the goal 802 of lane L2, a current intermediate goal is the goal 801 of following lane L1 and the next intermediate goal is the goal 802 of following lane L2; the goal 803 of decelerating in lane L1 indicates the transition from a current intermediate goal (goal 801 of lane L1) to the next intermediate goal (goal 710 of stopping at stop line S1 in L1); the goal 704 of traversing intersection is the transition from a current intermediate goal of stopping at stop line S3 in lane L21 to the next intermediate goal of following lane L13. Note that the current immediate goals are lane following and stopping, and thus the computation of the set $\mathcal{G}^*(q_i)$ is based on the longitudinal motion of the first model of the vehicle motion (2).

The computation of an under approximation of $\mathcal{G}^*(q_i)$ is based on the vehicle characteristics such as maximum steering, steering rate, acceleration, etc., and the first model of the vehicle motion (2).

One embodiment concerns goals of traversing intersections. For instance, the goal 704 of traversing intersection I3 connects the goal of stopping at the stop line S3 in lane L21 and the goal of following another lane, either 811 lane L13 or 812 lane L14. The goal graph allows this transition if such turn from lane L21 to lane L13 (or lane L14) is feasible on the static map stored in the third section 213 of the memory, and thus, there is a sequence of inputs that leads the vehicle state of the first model of the vehicle motion, starting from the stop line S3 in lane L21, to another lane L13 (or lane L14) through intersection I3. In other words, the intersection between the goal set of the stopping at any stop line and the union of backward reachable sets of another immediate goal set allowed by the goal graph is equal to the goal set of the stopping at the stop line.

$$\mathcal{G}^*(S) = \mathcal{G}(S), \quad (19)$$

where S indicates the goal of stopping at a stop line.

One embodiment concerns goals of decelerating to come to a full stop at a stop line. For instance, the goal 803 of decelerating in lane L1 connects the goal 801 of following lane L1 and the goal 710 of stopping at stop line S1 in lane L1. The computation of $\mathcal{G}^*(q_i)$ is based on the maximum deceleration of vehicle and the first model of the vehicle motion. This tells that the current state of the first model of the vehicle motion is in the set $\mathcal{G}^*(q_i)$ if the maximum deceleration results in full stop before stop line S1 in lane L1 while the position of the vehicle is maintained close to the center of lane L1.

One embodiment concerns goals of changing lanes. An example is the transition from the goal 801 of following lane L1 to the goal 802 of following lane L2. The static map stored in the third section 213 of the memory provides the initial heading angle that aligns with lane L1 and the final heading angle that aligns with lane L2. The computation of $\mathcal{G}^*(q_i)$ is based on realization that if the sharpest lane change is feasible at the current state of the first model of the vehicle motion, then so is any other smooth lane changes. The sharpest lane change is determined by the maximum and minimum steering and steering rate with minimum nonzero vehicle speed based on the first model of the vehicle motion (2). This concludes that if the sharpest lane change at the current state of the first model of the vehicle motion $x_1$ is feasible, then $x_1 \in \mathcal{G}^*(q_i)$.

It is possible to apply this method to determine the membership of the current state of the first model of the vehicle motion to the goal set $\mathcal{G}^*(q_i)$ with a limited amount of computations, to other various goals and transitions occurring in city driving.

Traffic

The avoidance of collisions and other dangerous interactions with traffic further reduces the size of the region that allows selecting a goal as the next intermediate goal. The reduced region of vehicle states can be obtained by removing, from the region of vehicle states to which the next goal can be accomplished according to the first model of the vehicle motion (2), the region of vehicle states that necessarily result in collision or dangerous interactions with other vehicles according to the first model of the traffic motion (10). One embodiment is based on realization that it is necessary to determine whether the state of the first model of the vehicle motion lies in the reduced region, rather than computing the reduced region explicitly. To check the membership, the existence of a finite sequence of states of the first model of the vehicle motion, starting from the current state of the first model of the vehicle motion, is determined such that the state avoids collisions and reaches the next goal.

The Decision Making module 302 determines whether the current state of the first model of the vehicle motion is in the reduced region from which the next goal can be accomplished while collisions with other traffic are avoided according to the first model of the traffic motion, by checking if there exists a safe sequence of states of the first model of the vehicle motion that satisfies the following conditions.

The existence of a safe sequence is checked by verifying that there exists a finite sequence of states of the first model of the vehicle motion such that: (1) one of the states reaches the next goal; (2) none of the states overlaps with the states of other vehicles according to the first model of the traffic motion; (3) the last state ensures the existence of an input that does not result in imminent collision at the subsequent time step.

To verify that the last state of a safe sequence ensures the existence of an input that does not result in imminent collision at the subsequent time step, a control invariant set is constructed as the set of states of the first model of the vehicle motion from which an input exists to maintain the state of the first model of the vehicle motion inside the set at the subsequent time step.

A collision set C is constructed as the set of differences between the states of the first model of the vehicle motion (2) and the states of the first model of the traffic motion (10), where the distance between the position of the first model of the vehicle motion (2) and the position of the first model of vehicles in the same lane (10) is shorter than a minimum safety margin. When the i-th vehicle is a lead vehicle in the same lane, the one-step bad set is constructed as $$B(C)=\{x_1 \in X_1: \forall u_1 \in U_i, \exists w \in W, u_{t1}^{(i)}, w_{t1}^{(i)} \quad (20)$$

$$\text{such that } f_1(x_1, u_1, w) - f_{t1}(x_{t1}, u_{t1}^{(i)}, w_{t1}^{(i)}) \in C\},$$

where $x_{t1}^{(i)}$ is the current state of the i-th vehicle in the traffic according to the first model of the traffic motion.

The bad set for an arbitrary number of steps is constructed based on the recursion $$B^0(C)=C \quad (21a)$$

$$B^{k+1}(C)=B(B^k(C)). \quad (21b)$$

The existance of an input sequence of length n that makes a state of the first model of the vehicle motion $x_1$ remain outside the collision set C at n step is verified by checking whether the state belongs to the complement of the n-steps bad set $$x_1 \in (B^n(C))^c \quad (22)$$

One embodiment of this present disclosure is based on realization that the complement of the union of bad sets, $$\left(\bigcup_{k=0}^{\infty} B^k(C)\right)^c, \quad (23)$$

is a control invariant set. The existance of an input sequence of arbitrary length for which a state of the first model of the vehicle motion $x_1$ is kept outside the collision set C is verified by checking whether the state belongs to the complement of the union of bad sets for any step length $$x_1 \in \left(\bigcup_{k=0}^{\infty} B^k(C)\right)^c. \quad (24)$$

Note that the bad set contains the configuration of rear-end collisions in a lane, not the configuration of side collisions. This is based on realization that one of states in a safe sequence should reach the next goal and the next goal is associated with the longitudinal part of the first model of the vehicle motion. For instance, for lane change from the goal 801 of lane L1 to the goal 802 of lane L2, a current intermediate goal is the goal 801 of following lane L1 and the next intermediate goal is the goal 802 of following lane L2; the goal 803 of decelerating in lane L1 indicates the transition from a current intermediate goal (goal 801 of lane L1) to the next intermediate goal (goal 710 of stopping at stop line S1 in L1); the goal 704 of traversing intersection is the transition from a current intermediate goal of stopping at stop line S3 in lane L21 to the next intermediate goal of following lane L13. The next goals are lane following and stopping. Since the last state in a safe sequence of the first model of the vehicle motion should be inside the control invariant set (the complement of the union of bad sets for any step length) and the next goal set has already been reached, the bad set can be constructed based only on the longitudinal motion of the first model of the vehicle motion (2).

The computation of the bad set is based on the longitudinal motions of the first model of the vehicle motion (2) and of the first model of the traffic motion (10). The membership of a state of the first model of the vehicle motion $x_1$ to the complement of the union of bad sets for any step length is verified by checking whether the maximum braking of the first model of the vehicle motion can avoid collision with a lead vehicle for whatever input of the first model of the traffic model the lead vehicle applies.

The existence of a safe sequence of states of the first model of the vehicle motion $x_1=(x_1(0), \ldots, x_1(N))$ is verified by solving the following problem:

$$\min_{x_1, u_1} J(x_1, u_1) \quad (25a)$$

Subject to $$x_1(t+1) = f_1(x_1(t), u_1(t), 0), \quad (25b)$$
$$\forall t \in \{0, \ldots, N-1\}$$

$$x_1(N_0) \in \mathcal{G}^*(q_{i+1}) \text{ for some } N_0 \leq N \quad (25c)$$

$$x_1(t) \notin O(x_{t1}^{(i)}(t)), \quad (25d)$$
$$\forall t \in \{0, \ldots, N\}, i \in \{1, \ldots, N_T\}$$

$$x_1(N) \in \left(\bigcup_{k=0}^{\infty} C^k(B)\right)^c \quad (25e)$$

where the objective function $J(x_1, u_1)$ can be chosen to optimize some performance, such as travel time, fuel consumption, or driver comfort. The solution of this problem $x_1$ constructs a safe sequence of the first model of the vehicle motion because constraint (25b) indicates the first model of the vehicle motion; constraint (25c) indicates that one of the states reaches the next goal set; constraint (25d) indicates that the vehicle states do not overlap with other traffic states, where $O(x_{t1}^{(i)})(t))$ is constructed as a set of states of the first model of the traffic motion around the state $x_{t1}^{(i)}(t)$ such that constraint (25d) ensures no collisions among vehicles for all disturbances w of the first model of the vehicle motion; and constraint (25e) indicates that the last state is inside the control invariant set, guaranteeing the existence of an input at the subsequent time step.

To verify whether the current state of the first model of the vehicle motion $x_1$ is inside the reduced region from which the next goal can be accomplished while collisions with other traffic are avoided according to the first model of the vehicle motion, the problem (25) is solved to check whether a safe sequence, starting from $x_1(0)=x_1$, exists. Some embodiments of this present disclosure are based on realization that it is possible to approximate constraints (25b)-(25e) as sets of linear inequalities by utilizing only the extreme inputs of the first model of the vehicle motion.

Problem (25) can be approximated by a linear programming problem if a cost function $J(x_1, u_1)$ is linear. By fixing a profile of heading angles $\theta(0), \ldots, \theta(N)$ as the sharpest curves, which can be computed by applying the maximum and minimum steering inputs, the dynamic constraint (25b) becomes linear. The goal set $\mathcal{G}^*(q_i)$ is naturally convex, so the constraint (25c) can be approximated by a set of linear inequalities with its boundary computed by utilizing the maximum and minimum acceleration, braking, and steering inputs. The complement of the bad set $(\cup_{k=0}^{\infty} B^k(C))^c$ is naturally convex, so the constraint (25e) can be approximated by a set of linear inequalities with its boundary computed by utilizing the maximum and minimum acceleration and braking. The constraint (25d) is naturally not convex. Based on the knowledge of the state of the first model of the traffic motion $x_{t1}^{(i)}(t)$ for k 0, . . . , N, the constraint (25d) is made to be convex by generating a wide tube within which the state of the first model of the vehicle motion reaches the next goal while avoiding any collisions, thereby being approximated in terms of the position of the state $x_{t1}^{(i)}(t)$ as a set of linear inequalities.

One embodiment of this present disclosure is that because of the relation (7) between the first model and the second model of the vehicle motion, the existence of a safe sequence of the first model of the vehicle motion guarantees the existence of a finite sequence of states of the second model of the vehicle motion where some of the states reach the goal, all states do not collide with other traffic, and the last state lies in the control invariant set.

Computational load can be further reduced by not letting the Decision Making module 302 generate a safe sequence by solving the problem (25), but letting the Motion planning module 304 in the module 303 check the existence of a safe sequence of states of the second model of the vehicle motion. In this case, the Decision Making module 302 provides the Planning and Control module 303 only with the intermediate goals, achievable when the obstacles are not present, and associated parameters.

All using (using first model of vehicle motion stored in first section of memory 211, and bound on error between first model and second model)

Computation of Plan with Multiple Goals

Based on the selecting one or more alternative current goals by the decision making module 302, the objective of the planning and control module 303 is to use these goals execute the current trajectory, by using information from sensors and communication 104.

The motion planning module 304 determines trajectories to at least one of the goals given by the decision making module 302, and compares the trajectories reaching the goal according to a cost function. The motion planning 304 uses a second model of vehicle motion stored in first section of memory 211 to determine a trajectory that achieves requirements on the motion of the vehicle.

FIG. 16 illustrates an exemplar list of possible requirements on the motion of an autonomous vehicle driving on roads, according to embodiments of the present disclosure. The requirements on the motion can be mapped to the constraints on the motion of the vehicle. For example, the requirements on the motion the vehicle can mandate the vehicle to stay on the road 1600. Possible additional requirements can mandate that the vehicle should drive in the middle of the lane 1610 with a nominal velocity 1620. A nominal velocity can be given by road speed limits, obtained from a map or sensed by a sensing system, it can be given by a driver or passenger of the vehicle, or it can be encoded into the goal computed by the decision making module 302. For instance, referring to FIG. 16, the decision module 302 can mandate the vehicle to stop at a stop line 501. For example, the requirements can also mandate the vehicle to maintain safety margin to surrounding obstacles. Surrounding obstacles can be detected by the sensors 105 and the future behavior of the obstacles can be predicted by a prediction system. In addition, another possible requirement is to maintain safety distance to vehicles in the same lane 1640, which can be, but in general are not, the same as 1630. For reasons of passenger comfort, fuel consumption, wear-and-tear, or other reasons, the specification can mandate a smooth drive 1650 of the vehicle. Requirements, as tabulated in FIG. 16, can be counteracting each other. For example, it can be impossible to maintain constant velocity 1620 while keeping a safety margin 1630 to surrounding obstacles, or the specification 1610 only states that the vehicle should maintain the middle of one of several lanes.

In some embodiments, the motion planning module 304 determines trajectories that reach each of the alternative goals from the decision module 302 and compare them in terms of performance to the driving requirements. However, some embodiments realize that it sometimes can be computationally prohibitive to exhaustively test all possible goals.

To this end, some embodiments describe the driving requirements and goals as constraints on the motion, $y_k=h(x_k)$, which the trajectory of the motion planning system should satisfy. For example, if one of the goals is the lane L1 at a nominal velocity $v_{nom}$ and two states are the position p and the velocity of the vehicle v, then ideally $v_{nom}=v$ and the position p should be very close to the coordinates of the lane L1, that is, the velocity of the vehicle should be the same as the nominal velocity and the position should be in the middle of the lane.

In one embodiment, a random noise source $e_k$ is added to the constraints, that is, $y_k=h(x_k, e_k)$. The noise source $e_k$ accounts for that the combined targets might not be, and probably are not, possible to satisfy exactly. The noise source can be chosen in several ways. For example, the noise source can be chosen as an additive Gaussian PDF with zero mean and covariance matrix $R_k$, that is, $e_k \sim \mathcal{N}(0, R_k)$, resulting in $y_k=h(x_k)+e_k$, or as a uniform distribution with minimum and maximum values, or as a multiplicative noise. It is possible that the noise source can be chosen in application-specific ways. In terms of a PDF, the specifications can be described as $y_k \sim p(y_k|x_k)$.

To that end, in one embodiment of the present disclosure, the constraints on the motion of the vehicle include one or combination of a bound on a deviation of a location of the vehicle from a middle of a road, a bound on a change from a current acceleration and a heading angle of the vehicle, a bound on a deviation from a desired velocity profile of the vehicle, and a bound on a minimal distance to an obstacle on the road. It is possible that the constraints on the motion of the vehicle can be probabilistic and include one or combination of a probability of a deviation of a location of the vehicle from a middle of a road, a probability of a deviation from a current acceleration and a heading angle of the vehicle, a probability on a deviation from a desired velocity profile of the vehicle, a probability on violating a minimal distance to an obstacle on the road.

The goal determined from the decision module 302 can take different forms. For instance, in one embodiment each goal set is a region in the state space of the vehicle, in another embodiment the goal set is a target lane, and a third embodiment uses the combination of a vehicle velocity and a lateral position as goal region.

Figure 17A:
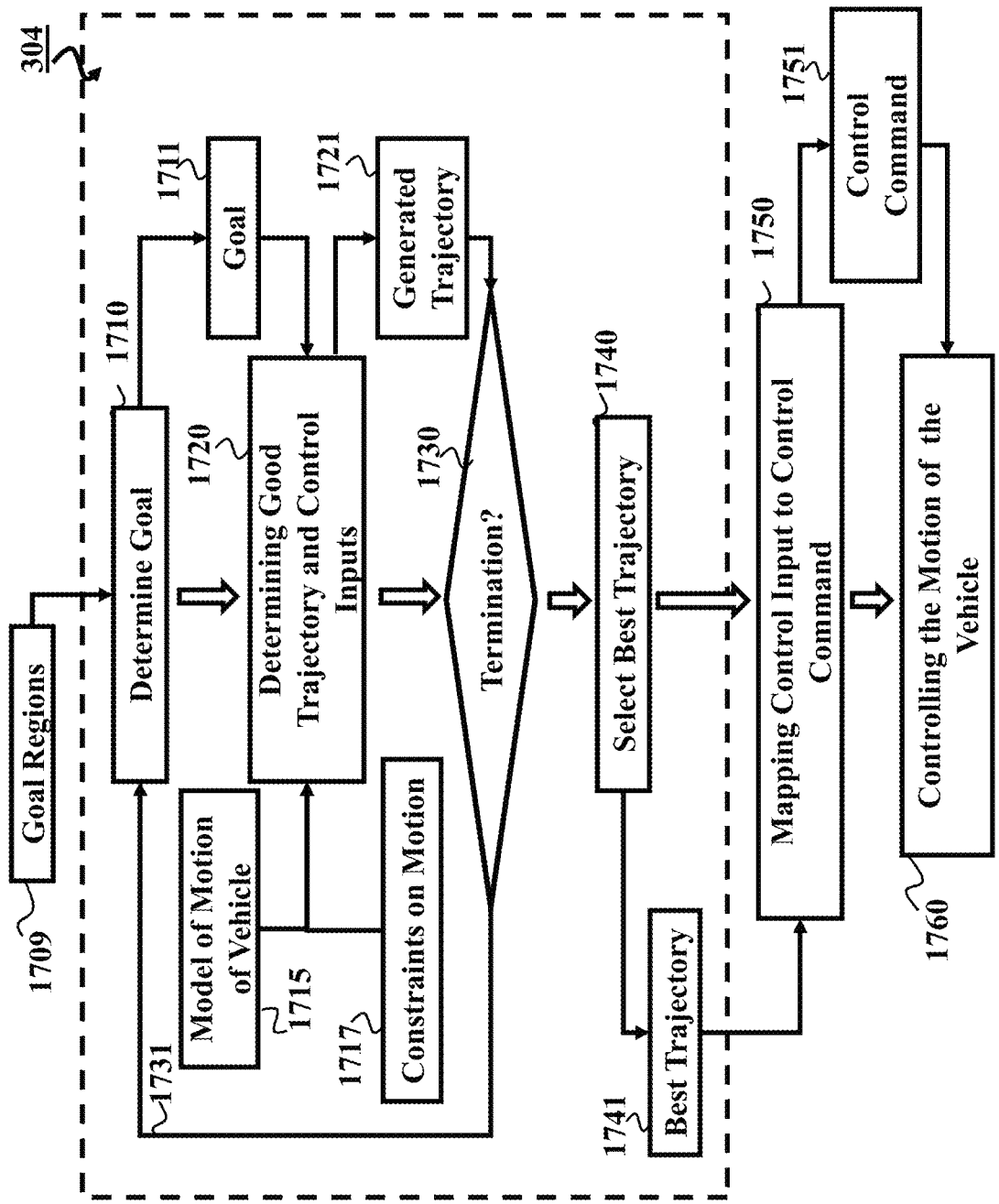
FIG. 17A illustrates a block diagram of a method for determining a trajectory and controlling a vehicle according to an embodiment of the present disclosure.

FIG. 17A illustrates a block diagram of a method for determining a trajectory and controlling a vehicle according to an embodiment of the present disclosure. The method can be implemented using a processor of the vehicle. The method determines 1710 a goal region 1711 from the set 1709 of goal regions determined from the decision making module 302. Then, using a second model of motion of vehicle 1715 stored in memory and constraints 1717 on the motion of the vehicle, the method determines 1720 a good trajectory and a set of control inputs 172, which when applied to the model of motion of the vehicle 1715 leads to a trajectory 1721 reaching the goal region while satisfying constraints 1717 on the motion of the vehicle. The second model 1715 of the motion of the vehicle can include an uncertainty on the motion of the vehicle, to capture that the model is not an exact version of the actual motion of the vehicle, and to account for sensing errors. The method iterates 1731 until a termination condition 1730 is met. When the condition 1730 is met, the method selects 1740 the best trajectory 1741 among the generated trajectories 1721 reaching the goal region 1710. For instance, the termination condition can be a time period or a predetermined number of iterations.

Next, the method maps 1750 the sequence of control inputs corresponding to the best trajectory 1741 to a control command 1751 to at least one actuator of the vehicle and controls 1760 the motion of the vehicle according to the control command.

In some embodiments, the determining 1710 the goal region is done exhaustively, that is, all goals 1709 are selected iteratively 1731. Other embodiments determine 1710 the goal statistically. This can be advantageous, for instance, when the number of goal regions 1709 is so large that it is computationally overwhelming to iterate 1731 over all goals.

Figure 17B:
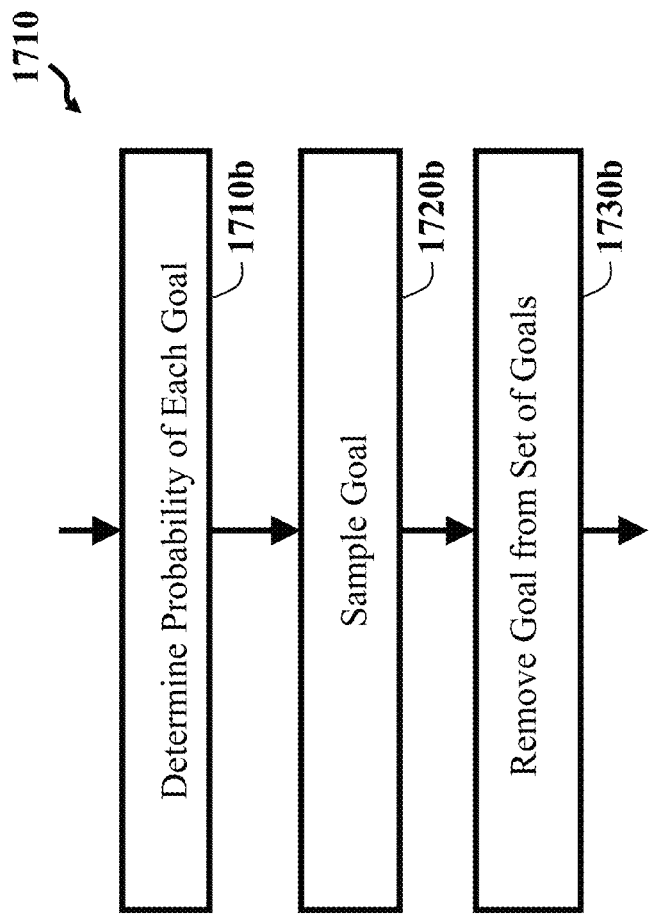
FIG. 17B shows an exemplar implementation of the determining the goal according to an embodiment of the present disclosure.

FIG. 17B shows an exemplar implementation of the determining 1710 the goal 1711 according to an embodiment of the present disclosure. The determining 1710 uses information about the trajectory 1740 selected during executions of the planning module 304, the predicted behavior of the environment, such as other vehicles, and the driving preferences, such as those in FIG. 16. The determining 1710 determine the probability of each goal in the set of goals 1709 of being a preferred goal. The determining 1710 then samples 1720b a goal from the set of goal regions 1709 according to the probability 1710b. After sampling a goal 1720b, the corresponding goal is removed 1730b from the set of goals 1709, thus ensuring that the planning module 304 does not spend effort on goals for which trajectories have already been computed.

The probabilities can be determined in several ways. For instance, one embodiment models the possible goals as a set of modes $\mathcal{M} = \{S, SL, CLL, CLR\}$, where the modes are full stop (S), stay in lane (SL), change lane left (CLL), and change lane right (CLR), and uses a finite-state Markov process with transition probabilities associated with each decision. The transition probabilities can be determined from the driving context perceived from the sensing system, in combination with information propagating from the decision module 302. The transition model between any two modes j and i is $m_j \sim p(m_j|m_i)$ for a probability density function p.

In some iterations, the intermediate goals are ranked according to a combination of the probability to stay away of risk of collision, satisfying constraints on the second model of motion of the vehicle, being consistent with intermediate goals selected during previous iterations, and being consistent with a trajectory determined during previous iterations.

For example, one embodiment ranks the goals with respect to how much change in control inputs to the vehicle are needed in order to fulfill the respective goal. That is, for a previously determined trajectory, if a specific goal can be fulfilled only if deviating from the previously determined trajectory, it will be given less priority. In another embodiment, the goals that are more likely to lead to a trajectory staying out of risk of collision with other objects on the road, are given a higher rank.

Other embodiments use other criteria to rank the goals among each other in terms of importance. For instance, one embodiment ranks those goals higher, which are similar to previously chosen goals. For instance, if there are two intermediate optional goals on a two-lane road, where each of the goals makes it possible to follow either of the lane, and if in a previous iteration of the decision module 302, it has been determined a goal corresponding to reaching the left lane, preference will be given to the current optional goal of staying in the left lane.

Figure 17C:
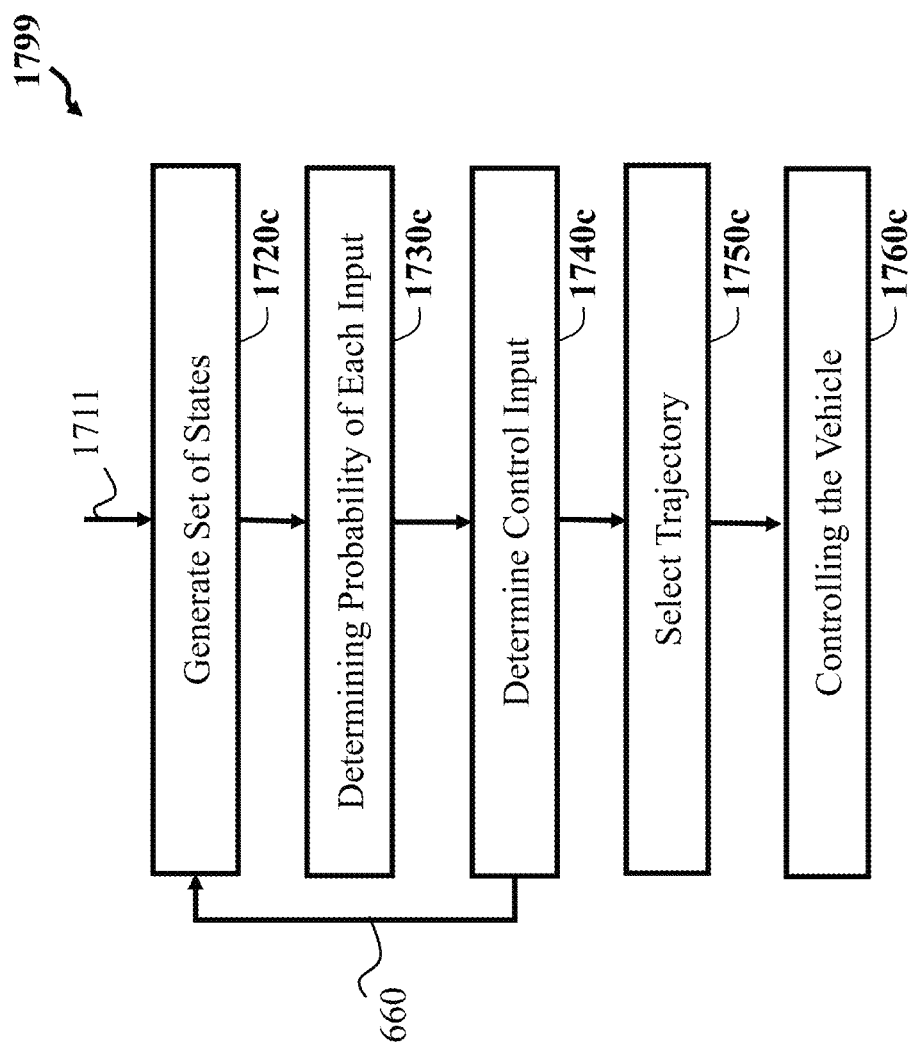
FIG. 17C shows a flowchart of a method for the determining a good trajectory and corresponding control inputs according to an embodiment of the present disclosure.

FIG. 17C shows a flowchart of a method 1799 for the determining 1720 a good trajectory and corresponding control inputs 1721 according to an embodiment of the present disclosure. The method determines iteratively a sequence of control inputs specifying the motion of the vehicle from an initial state of the vehicle to a target state of the vehicle. In different embodiments, the initial state is a current state of the vehicle and/or wherein the initial state is the state corresponding to the control input determined during a previous iteration of the method.

Figure 17D:
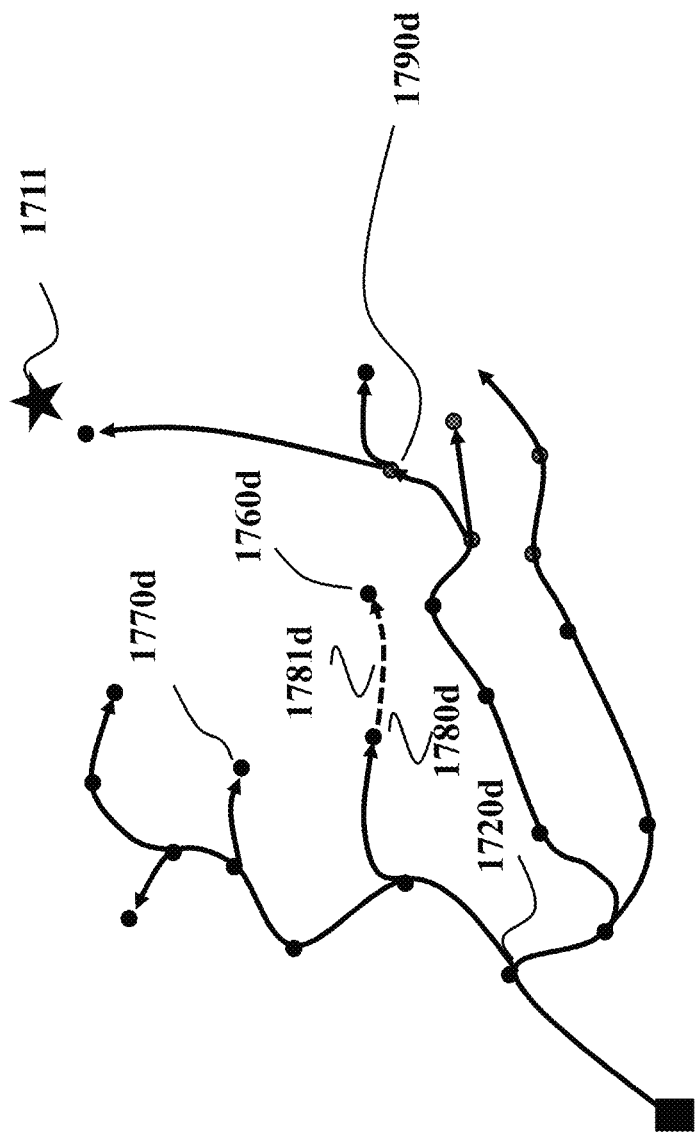
FIG. 17D illustrates the motion defined by the state transitions connecting states of the vehicle according to an embodiment of the present disclosure.

FIG. 17D illustrates the motion defined by the state transitions connecting states of the vehicle according to an embodiment of the present disclosure. Each state includes a location, a velocity, and a heading of the vehicle. The trajectory is determined iteratively until a termination condition is met, for example, for a time period or for a predetermined number of iterations. An iteration of the method of FIG. 17C includes the following steps.

The method determines 1720c an initial state, a set of control inputs and, a corresponding set of state transitions such that the state and transition satisfy static and dynamic constraints on the state of the vehicle. For example, the method determines the state 1780d, the state transition 1781d, and the state 1760d in FIG. 17D.

Figure 17E:
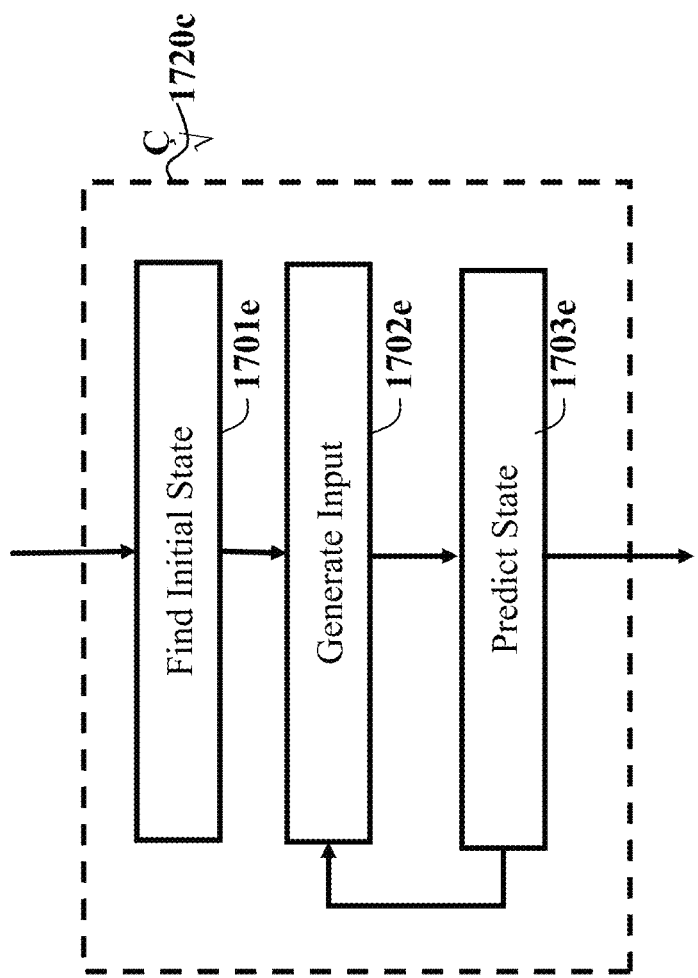
FIG. 17E illustrates a flowchart of an exemplar implementation of the determining the set of states according to one embodiment of the present disclosure.

FIG. 17E shows a flowchart of an exemplar implementation of the determining the set of states 1720c according to one embodiment of the present disclosure. The determining 1720c uses information about the environment and states determined using previous iterations. Examples of the previous states include the states 1720d, 1780d, 1770d, and 1790d in FIG. 17D.

The exemplar implementation performs initial finding of a state 1701e. If it is the first iteration of the method, the initial state is the current state of the vehicle. Otherwise, the initial state can be determined in many ways. For example, the initial state can be determined as the state with the smallest Euclidean distance to the position of the goal region 1711, the initial state can be determined by generating a uniform integer random number between [1, M], where the initial state is number 1 and the last state determined in the previous iteration is number M, or the initial state can be determined as the state corresponding to the control input determined during the previous iteration.

The method generates 1702e a set of control inputs and predicts the state using the set of control inputs. In some embodiments, the control inputs are generated from the noise source of the second model of motion of the vehicle. For instance, the control input can be generated from a Gaussian distribution, it can be chosen from a probability distribution tailored to the application, or it can be generated by designing a feedback controller that generates control inputs as a combination of the deviation from the driving requirements. In one embodiment, the generation 1702e of control inputs and prediction of corresponding state 1703e is done in a loop, where the number of iterations can be determined beforehand.

Figure 17F:
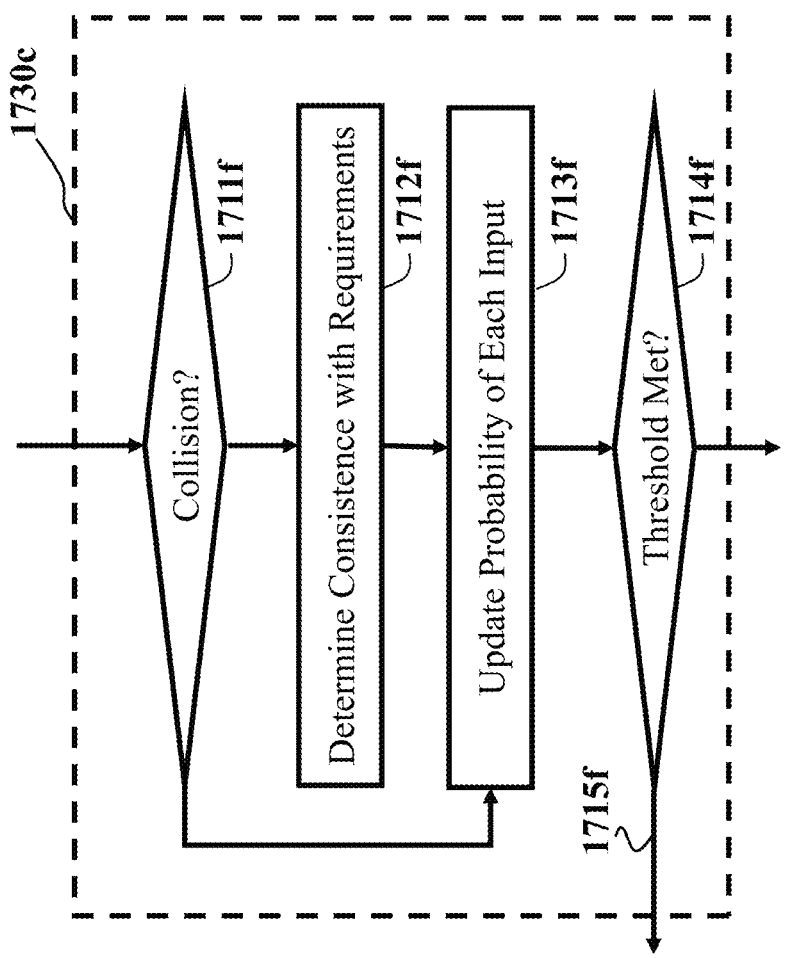
FIG. 17F illustrates a flowchart of a method that determines the quality of each input producing movement to a state satisfying the constraints on the motion of the vehicle according to one embodiment of the present disclosure.

FIG. 17F shows a flowchart of a method 1730c that determines the quality of each input producing movement to a state satisfying the constraints on the motion of the vehicle according to one embodiment of the present disclosure. When determining the quality of each input, the next state 1703e is first checked for collision 1711f. If the next state 1703e and the state transition leading up to the state 1711f is collision free, consistence of the state with the requirement is determined 1712f and the probability of each input is computed 1713f.

In one embodiment, if the collision check 1711f determines that the next state collides with an obstacle, the probability of the input leading to a state satisfying the constraints on the motion of the vehicle can be set to zero. The collision check can be deterministic, or it can be probabilistic, where a collision can be assumed to happen if the probability of a collision is above some threshold, where the prediction of obstacles is done according to a probabilistic motion model of the obstacle.

Figure 17G:
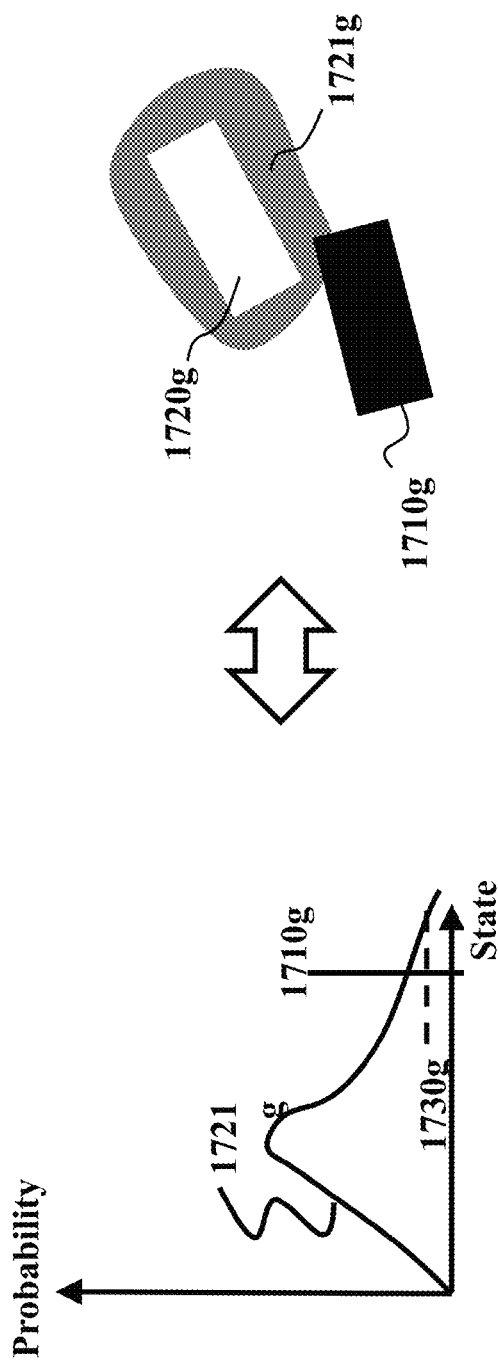
FIG. 17G illustrates an example where the prediction of the location of the autonomous vehicle intersects with the uncertainty region of the obstacle, and where the probability of the obstacle being at the location is higher than a collision threshold, according to one embodiment of the present disclosure.

FIG. 17G shows an example where the prediction of the location 1710g of the autonomous vehicle intersects with the uncertainty region 1721g of the obstacle 1720g, and where the probability of the obstacle 1720g being at the location 1710g is higher than a collision threshold 1730g, according to one embodiment of the present disclosure. For example, a sensor of the vehicle can determine a position of an obstacle as a function of time. The motion-planning system 304 determines a probability of the next state to intersect with an uncertainty region of the obstacle and assigns a zero probability to the generated state and control input when the probability of the next state to intersect with the uncertainty region of the obstacle is above a collision threshold.

In one embodiment, the regions 1721g are determined from a prediction module taking uncertainty into account. In another embodiment, the regions are determined from the decision making module 302. For instance, referring to FIG. 10, the region 1001, 1002, or 1003, can be chosen as 1721g.

The determining 1740c of the input and corresponding state can be done in several ways. For example, one embodiment determines control input by using a weighted average function to produce the state as $x_{k+1} = \Sigma_{i=1}^{N} \omega_{k+1}^{i} x_{k+1}^{i}$ and similar for the control input. Another embodiment determines control input as the state and input with highest probability, that is, $i = \text{argmax } \omega_{k+1}^{i}$. It is possible that one embodiment determines the control input by averaging over a fixed number m<N of sampled control inputs.

Figure 17H:
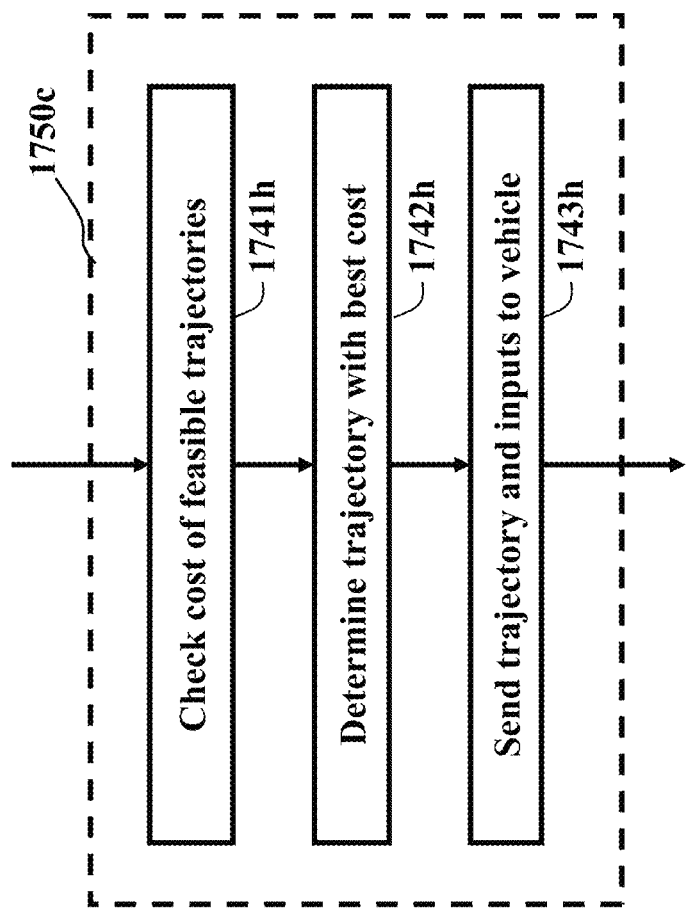
FIG. 17H illustrates a block diagram for selecting trajectory 1750c of the vehicle, according to one embodiment of the present disclosure.

FIG. 17H shows a block diagram for selecting trajectory 1750c of the vehicle, according to one embodiment of the present disclosure. All motions that have reached the goal 1711 are checked 1741h according to their cost function, the motion resulting in best cost is determined 1742h, and the motion with corresponding control inputs are sent 1743h to the vehicle-control system.

Some embodiments controls 1760c the vehicle according to the trajectory determined by the motion-planning system 304. The trajectory computed by the motion-planning system is used as a reference trajectory to the control system of the vehicle. In one embodiment, the control inputs are used as feedforward components to the vehicle-control system. For example, one embodiment of the present disclosure uses reference trajectories in the form of Cartesian planar locations and uses steering angle and acceleration of the vehicle as feedforward components. In one embodiment, the reference trajectory contains position, velocity vector, and heading of the vehicle.

Figure 18A:
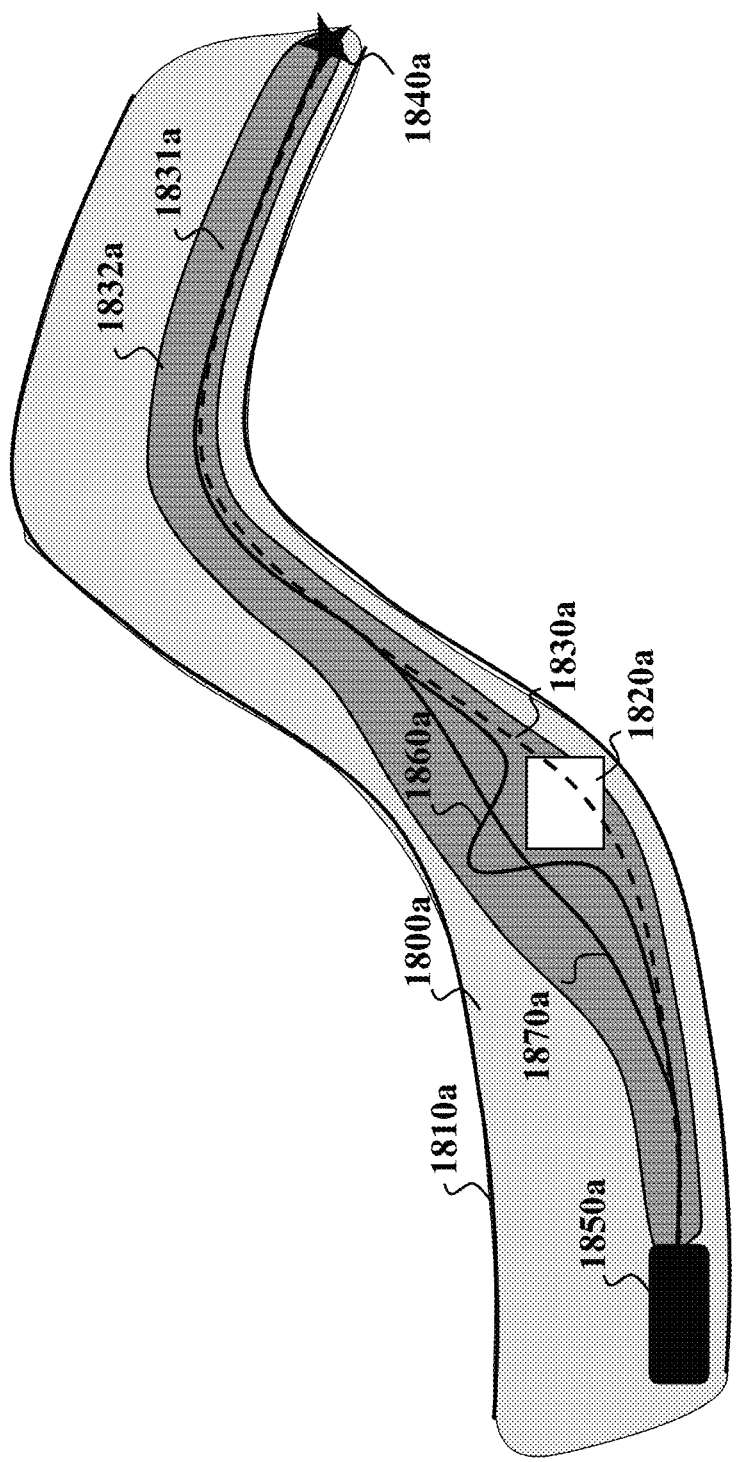
FIG. 18A illustrates a schematic of different motions determined according to some principles employed by some embodiments of the present disclosure.

FIG. 18A illustrates a schematic of different motions determined according to some principles employed by various embodiments of the present disclosure. The drivable area 1800a includes the road 1810a except for the area 1820a where an obstacle is present. The preferred motion 1830a, which can be determined from lane information, the intents of a driver, a passenger of the vehicle, or from the decision making module 302, can be interpreted as the reference motion that reaches the target region 1840a from the current state 1850a of the vehicle, but goes through the non-drivable area of the obstruction 1820a. The preferred motion 1830a can be modeled as a probabilistic constraint in the form of a probability density function (PDF) 1831a over the state of the vehicle, where the preferred motion 1830a is the mean of the PDF and the allowed deviation from the mean is modeled as a standard deviation 1832a. In such a case, motions are given different probabilities depending on how much they intersect with the PDF 1831a. The motion planner generates the motion, such as motions 1860a and 1870a, which avoid the obstacle 1820a but starts and ends at the same positions as the desired motion 1830a.

In some of the embodiments of the present disclosure, the motion is computed by; first determining several motions from initial state to target state according to the probabilities of being a good motion; second, optimizing a deterministic cost function that combines deviations from a nominal motion and other measures of performance, for example, deviations from a nominal velocity, distance to surrounding obstacles, or the magnitude of steering input. To illustrate, the motion 1860a stays close to the desired motion, whereas motion 1870a signifies the importance of maintaining small steering inputs. Several different motions that lead to the target region 1840a can be computed, and the cost function determines which motion to select.

Figure 18B:
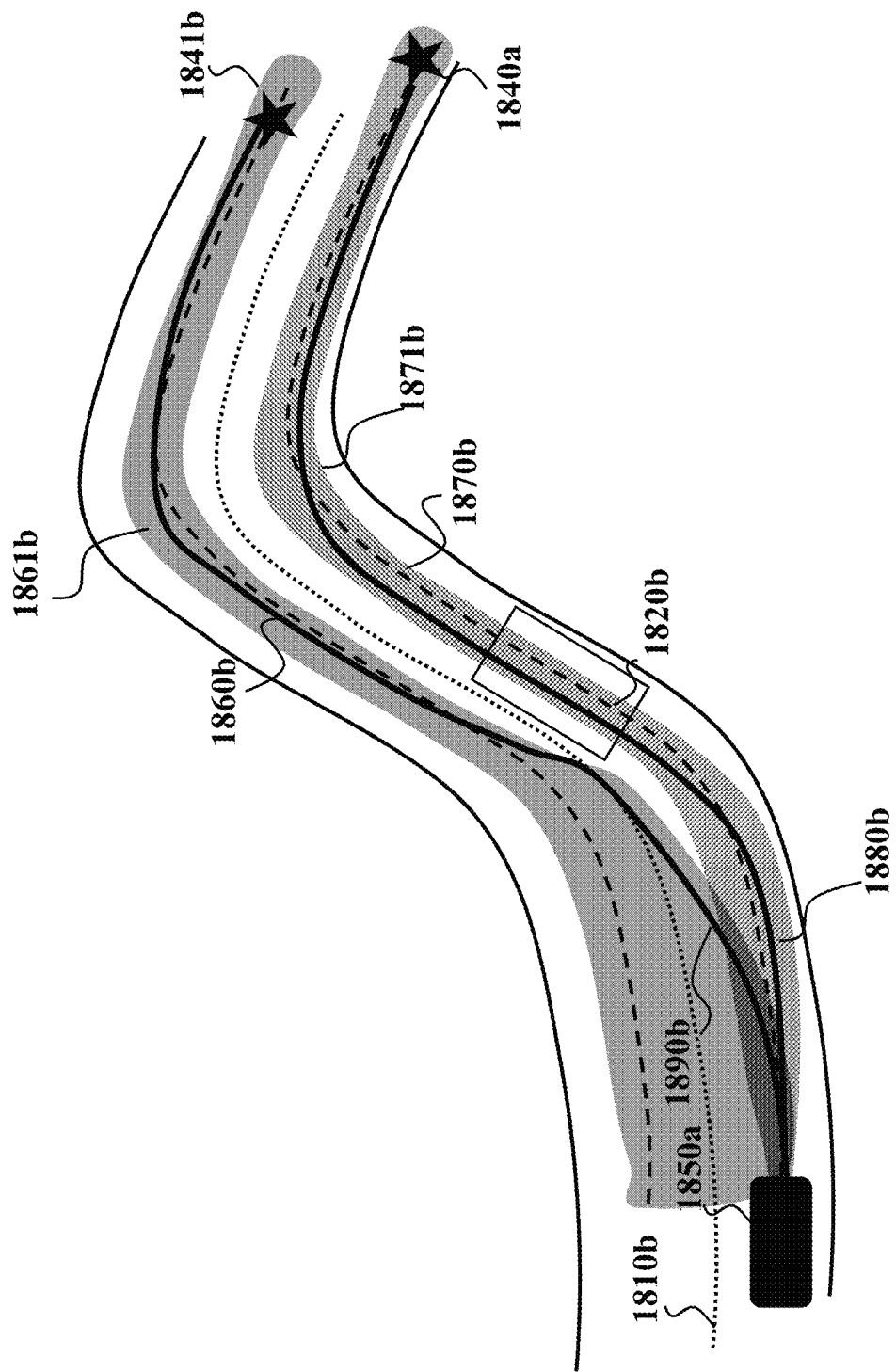
FIG. 18B illustrates a schematic of different motions determined according to some principles employed by some embodiments of the present disclosure.

FIG. 18B illustrates a schematic of different motions determined according to some principles employed by some embodiments of the present disclosure. The autonomous vehicle is at the current state 1850a on a two-lane road with lane divider 1810b, with a moving obstacle 1820b in the first lane. There are two goal regions 1840a and 1841b, determined from the decision module 302. The requirements on the motion can be that the vehicle should maintain either of the two lanes 1860b and 1870b, with the respective tolerated probabilistic deviation 1861b and 1871b from the requirement, so the motion planner can determine to either stay in the first lane or move to the second lane, as long as it reaches any of the goals. The black lines 1880b and 1890b show two possible computed motions by the motion planner 304. The trajectory 1890b is not satisfying the requirement 1860b until after approximately midway through the path. Hence, if the cost function has a large weight on deviations from the requirement 1860b, the trajectory reaching the goal 1840a will be chosen.

Figure 18C:
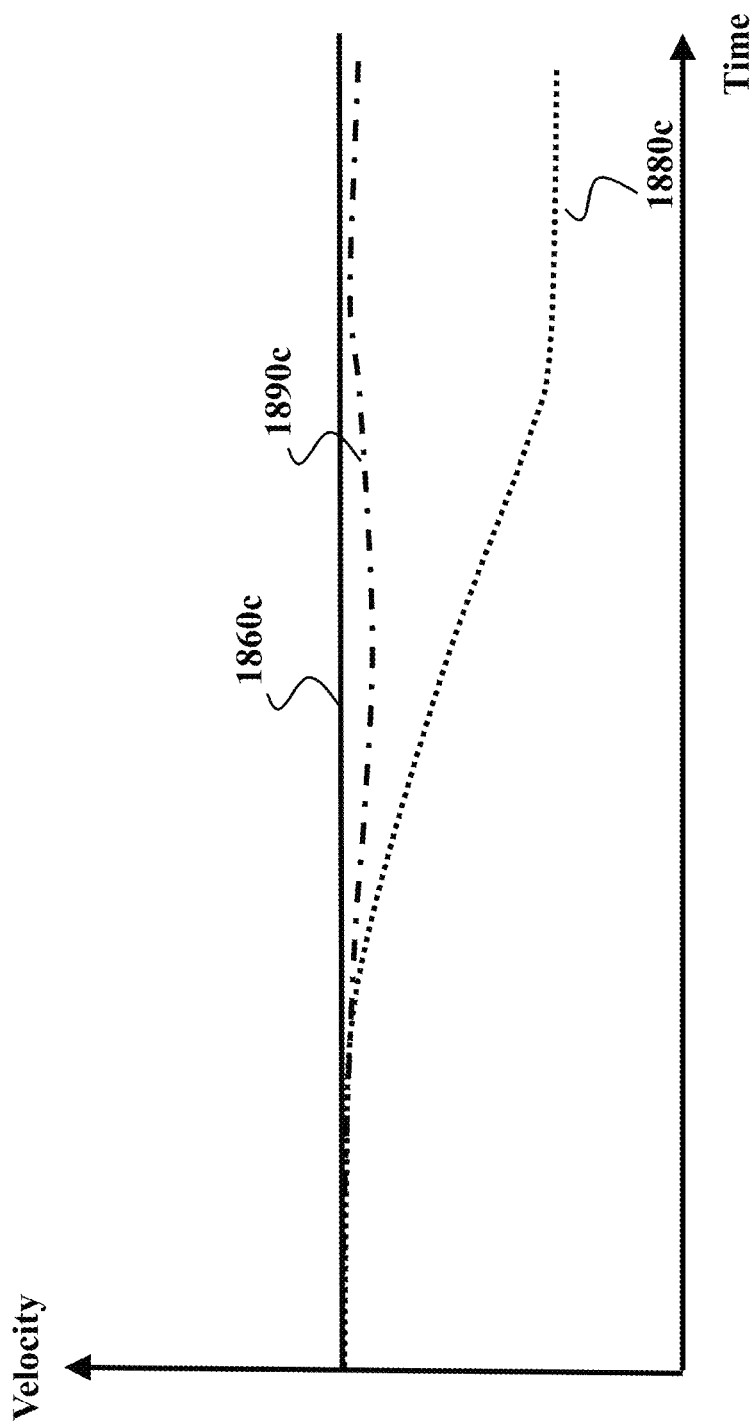
FIG. 18C illustrates the respective velocity profiles 1880c and 1890c corresponding to 1880b and 1890b, together with the requirement 1860c of maintaining a nominal, in this case constant, velocity, according to one embodiment of the present disclosure.

FIG. 18C illustrates the respective velocity profiles 1880c and 1890c corresponding to 1880b and 1890b, together with the requirement 1860c of maintaining a nominal, in this case constant, velocity, according to one embodiment of the present disclosure. In FIG. 18C, the velocity 1880c corresponding to the trajectory 1880b is not satisfying the constraint. Some embodiments of the present disclosure weigh these two and additional requirements together when determining the best motion.

Figure 19:
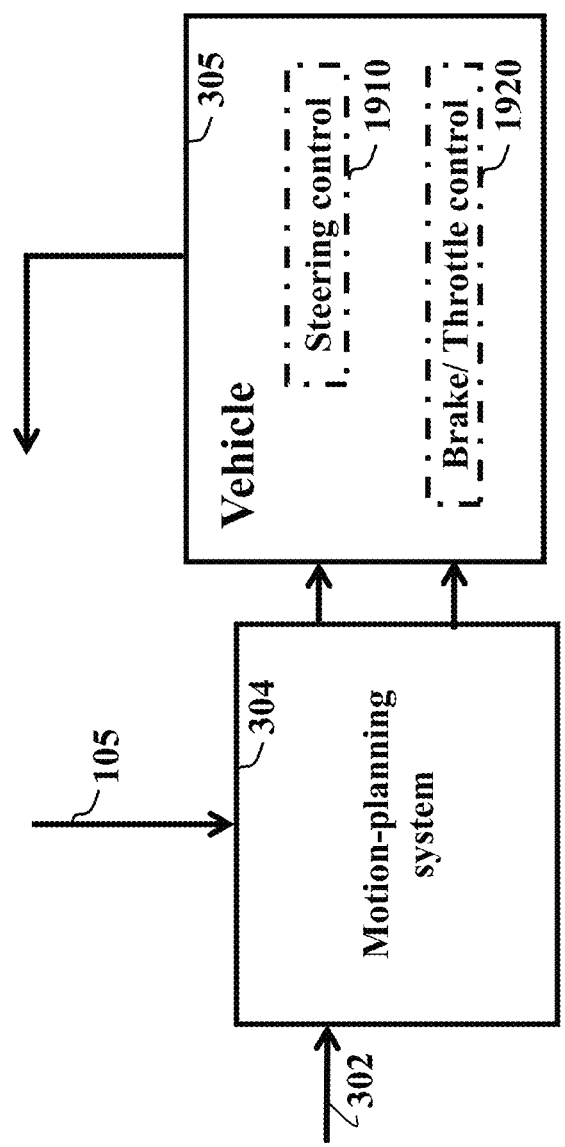
FIG. 19 illustrates a schematic of interaction between the motion planning system and the vehicle controller according to some embodiments of the present disclosure.

FIG. 19 illustrates a schematic of interaction between the motion planning system and the vehicle controller according to some embodiments of the present disclosure. For example, in some embodiments of the present disclosure, the controllers 305 of the vehicle 101 are steering 1910 and brake/throttle controllers 1920 that control rotation and acceleration of the vehicle 101. However, in one embodiment the motion-planning system 304 uses a model such that the control inputs in the motion planner 304 are steering and velocity. To that end, a vehicle controller 305 maps the control input to a control command to at least one actuator of the vehicle, such as the steering wheel and/or the brakes of the vehicle, and controls the motion of the vehicle using the control command to the actuator of the vehicle.

For example, the control input of the motion planner can be added to the reference trajectory of the vehicle-control system 305. In one embodiment, the control inputs computed in the motion planner to move the vehicle, are used as feedforward control inputs to the true vehicle-control system, for example, when the control inputs of the motion-planning system 304 are partly the same as 1910 and 1920. Doing in such a manner, the true vehicle-control system only controls deviation due to modeling errors in the motion planner.

The motion-planning system 304 selects a motion subject to minimizing a cost function $J(x,u,\sigma_y) = j(x(T),u(T),\sigma_y(t)) + \int_0^T g(x(t),u(t),\sigma_y(t))dt$ and satisfying constraints on the movement of the vehicle and avoiding collision with obstacles. One embodiment chooses the cost function as $J = \int_0^T k_1 \|p - p_{ref}\| + k_1 \|v - v_{ref}\| dt$, where $k_1$ and $k_1$ are positive weights on the Euclidean distances, $p_{ref}$ and $v_{ref}$ are desired path and velocity, respectively, coming from the decision module 302 or are predetermined, computed, for example, from driver or passenger inputs, or estimated from cameras, and p and v are position and velocity of the vehicle. In other embodiments, the cost function is chosen as $J=T$, where T is the time of the motion to reach the goal 1711 from initial state. Yet another embodiment uses $g = k_1 \Delta\delta + k_2 \Delta v$, where $\Delta\delta$ and $\Delta v$ are the differences in steering and velocity between two consecutive time steps, respectively, and vice versa. In other embodiments, the performance metric includes a measure of the comfort level of the passengers of the vehicle. For instance, the comfort level can be determined from experiences of passengers of the vehicle that are mapped to desired lateral acceleration, a desired steering rate, and a desired longitudinal acceleration of the vehicle.

Features

According to aspects of the present disclosure, the vehicle state can include a vehicle position, velocity of the vehicle and a heading of the vehicle, and wherein the driving mapped data includes map data, such as addresses, road networks, intersections, stop sign locations, traffic light locations, a number and a position of traffic lanes and speed limits. A goal set constituted by a set of vehicle states is associated to a goal, such that the feasibility to achieve the goal is based on computing a sequence of backward reachable sets of the goal set according to the first model of motion of the vehicle and an uncertainty set in the first model of motion of the vehicle, and testing if a current vehicle state is included into any of the sequence of the backward reachable sets. Further, the uncertainty set can be determined based on the first model of motion of the vehicle, such that if the vehicle state according to the first model of motion of the vehicle is included into a backward reachable set of the goal set computed according to the first model of motion of the vehicle and the uncertainty set, then a vehicle state in the goal set can be achieved according to the second model of motion of the vehicle. Further still, the backward reachable sets in the sequence are iteratively computed by initializing the first backward reachable set in the sequence to be the goal set of the goal, and by constructing the next backward reachable set in the sequence from the previous backward reachable set in the sequence by determining the set of states that can be driven to the previous backward reachable set in the sequence in one time interval according to the first model of motion of the vehicle for every value of uncertainty in the uncertainty set.

According to aspects of the present disclosure, the testing of the feasibility of completing the next specific goal is based on verifying that there are a sequence of intermediate goals beginning with the current intermediate goal and terminating in the next specific goal, where each next goal can be achieved from any vehicle states in the goal set of the previous goal in the sequence within the time determined by a prediction horizon. Further, the completing of the sequence of intermediate goals can be determined by verifying that for any pair of consecutive intermediate goals in the sequence, there is at least one vehicle state of the first model of motion of the vehicle that is contained in an intersection of the intermediate goal vehicle state of a first intermediate goal in the pair, and a backward reachable set of a second intermediate goal in the pair, and that the vehicle state is included in the sequence of intermediate goals that includes the first intermediate goal.

According to aspects of the present disclosure, the testing the feasibility the intermediate goal satisfies the traffic conditions is based on determining that a collision according to the first model of motion of the vehicle and to the first model of motion of the traffic is avoided. Further, the determining the collision is avoided, is based on solving an optimization problem that includes a cost function, constraints related to the first model of motion of the vehicle, constraints related to completing the next goal, constraints related to avoiding collision at a current time, and constraints related to avoiding collision at future times. Further still, the constraints relating to avoiding collision at the current time are determined based on a state of the vehicle and a state of the traffic belongs to a collision set, such that the collision set contains the states of the first model of the vehicle motion and states of the first model of the traffic motion, where a distance between a position of the first model of the vehicle motion and a position of the first model of traffic motion is shorter than a minimum safety margin. It is possible that the constraints relating to avoiding collision at the future times are determined by a complement set of a sequence of bad sets constructed according to the first model of the motion of the vehicle, the uncertainty, and the first model of motion of the traffic, by a forward recursion generating a sequence of sets, such that each set in the sequence of sets determines whether a collision happens in a specific time interval in the future. Such that, the forward recursion starts from the set of states for which there exists no command to the vehicle that avoids the collision in a next time interval in the future according to the first model of the motion of the vehicle and the first model of motion of the traffic, and proceeds by verifying the set of states for which there exists no command to the vehicle, and avoids an entering of the set computed at the previous iteration. Further, the optimization problem is approximated by a linear program, by approximating the first model of motion of the vehicle that considers a profile of heading angles generated according to a set of sharpest curves and according to at least one parameter of motion of the vehicle. Approximating the constraints related to being able to complete the next goal as a set of linear inequalities that is computed according to a minimum vehicle acceleration and a maximum vehicle acceleration, braking, and steering. Approximating the constraints of avoiding the future collision as a set of linear inequalities that is computed according to the minimum and the maximum vehicle acceleration and braking. Approximating the constraints of avoiding collision at the current time as a set of linear inequalities that is computed based on a wide tube shaped region of states that do not overlap with traffic, and by defining a linear cost function.

According to aspects of the present disclosure, the computed feasible intermediate goals are ranked according to a combination of a probability to stay away of risks of a collision, satisfying constraints on the second model of motion of the vehicle, and consistent with the computed feasible intermediate goals selected during a last prediction horizon preventing a collision with at least one vehicle, and consistent with a computed trajectory during the last prediction horizon preventing the collision with the at least one vehicle. Further, the selecting of the computed feasible intermediate goals is based on assigning probabilities according to the ranking of the computed feasible intermediate goals, so as to produce a set of computed feasible intermediate goals according to their probability. Further still, the consistency with the previous computed feasible intermediate goals is determined based on a preference of using similar computed feasible intermediate goals during different previous prediction horizons. Further still, wherein the constraints on the second model of motion of the vehicle includes a bound on a maximum deviation from a lane, a bound on a maximum allowed steering angle of the vehicle, and a bound on a maximum allowed deviation from a preferred velocity profile. It is possible that the consistency of the computed feasible intermediate goal with a trajectory determined during the last prediction horizon is based on a scoring function that measures an amount of change of control input needed to reach the computed feasible intermediate goal, and wherein the computed feasible intermediate goal from the set of computed feasible intermediate goals that minimizes the scoring function is determined as the control input.

According to aspects of the present disclosure, the metric of performance includes one of combination of a deviation of a location of the vehicle from a middle of a road, a deviation from a desired velocity profile of the vehicle, a deviation from a minimal distance to an obstacle on the road, and a deviation of a comfort level of the vehicle, such that the comfort level is determined from a desired lateral acceleration, a desired steering rate, and a desired longitudinal acceleration of the vehicle. Another aspect can include the computing of the trajectory for each feasible intermediate goal includes determining an initial state of the vehicle, and submitting the initial state to the second model of motion of the vehicle. Determining, using the second model of motion of the vehicle having an uncertainty and the second model of motion of traffic, a set of inputs to the motion model of the vehicle and a set of corresponding state transitions of the vehicle satisfying constraints on the second motion of model of vehicle and reaching a computed feasible intermediate goal. Determining the metrics of performance of the trajectory, such that the computed trajectory is compared with respect to the metrics of performance in determining the control input.

According to aspects of the present disclosure, the computing of the trajectory for each feasible intermediate goal includes determining an initial state of the vehicle, and submitting the initial state to the second model of motion of the vehicle. Determining, using the second model of motion of the vehicle having an uncertainty and the second model of motion of traffic, a set of inputs to the motion model of the vehicle and a set of corresponding state transitions of the vehicle satisfying constraints on the second motion of model of vehicle and reaching a computed feasible intermediate goal. Determining the metrics of performance of the trajectory, such that the computed trajectory is compared with respect to the metrics of performance in determining the control input. Another aspect can include the testing the feasibility of each intermediate goals is based on a vehicle state and the traffic conditions at a beginning of the prediction horizon, wherein the specific goals include specific turns at intersections that are specific in order to reach a final destination, and the additional specific goals include vehicle operational constraints according to driving rules, and wherein the optional goals includes the vehicle changing lanes without violating any of the specific goals or the additional specific goals. Wherein another aspect includes the testing the feasibility of each intermediate goal is based on a vehicle state and the traffic conditions at a beginning of the prediction horizon, wherein the specific goals include specific turns at intersections that are specific in order to reach a final destination, and the additional specific goals include vehicle operational constraints according to driving rules, and wherein the optional goals includes the vehicle changing lanes without violating any of the specific goals or the additional specific goals.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A control system of an autonomous vehicle, residing within the vehicle, computing in real-time while traveling trajectories for future prediction horizons along a travel route using sensor data obtained while moving toward a final destination, comprising:
    a transceiver to accept traffic conditions from sensors;
    a memory to store data including driving mapped data and vehicle data;
    a hardware processor coupled to a memory, the memory to store instructions, which when executed by the hardware processor, cause the hardware processor to perform operations for operating the vehicle, the operations including:
        receive vehicle state data from vehicle sensors, and determine a vehicle state including a position, a velocity, a heading, a steering angle and a yaw rate of the vehicle using the vehicle state data;
        produce a sequence of intermediate (SoI) goals from the travel route using the stored data, wherein the (SoI) goals includes destination goals to reach the final destination, additional goals that includes vehicle operational constraints according to driving rules and optional goals;
        determine present feasible intermediate goals in the SoI goals, such that an intermediate goal is present feasible if the intermediate goal can be achieved based on a vehicle state and traffic conditions at a beginning of the prediction horizon by satisfying the motion capabilities of the vehicle according to a first model of motion of the vehicle, and the traffic conditions according to a first model of motion of the traffic, and that at least one next intermediate goal following the present feasible intermediate goal in the SoI goals will be feasible, after the present feasible intermediate goal will have been be achieved;
        compute a trajectory for each present feasible intermediate goal using a second model of motion of the vehicle and a second model of motion of the traffic, and compare each computed trajectory according to a numerical value determined by a cost function and the satisfaction of constraints on the movement of the vehicle and the vehicle interaction with the the traffic;
    a vehicle controller to compute a control input to at least one actuator of the vehicle so that the vehicle motion produces a trajectory as close to the computed trajectory; and
    at least one actuator controller to execute the control input to the at least one actuator of the vehicle to modify the motion of the vehicle.

2. The control system according to claim 1, wherein the vehicle state includes a vehicle and a, and wherein the driving mapped data includes map data, such as addresses, road networks, intersections, stop sign locations, traffic light locations, a number and a position of traffic lanes and speed limits.

3. The control system according to claim 2, wherein a goal set constituted by a set of vehicle states is associated to a goal, such that the feasibility to achieve the goal is based on computing a sequence of backward reachable sets of the goal set according to the first model of motion of the vehicle and a state uncertainty set in the first model of motion of the vehicle, and testing if a current vehicle state is included into any of the sequence of the backward reachable sets.

4. The control system according to claim 3, wherein the state uncertainty set is determined based on the first model of motion of the vehicle and on the second model of motion of the vehicle, such that if the vehicle state according to the first model of motion of the vehicle is included into a backward reachable set of the goal set computed according to the first model of motion of the vehicle and the state uncertainty set, then a vehicle state in the goal set can be achieved according to the second model of motion of the vehicle.

5. The control system according to claim 3, wherein the backward reachable sets in the sequence are iteratively computed by initializing the first backward reachable set in the sequence to be the goal set of the goal, and by constructing the next backward reachable set in the sequence from the previous backward reachable set in the sequence by determining the set of states that can be driven to the previous backward reachable set in the sequence in one time interval according to the first model of motion of the vehicle for every value of uncertainty in the state uncertainty set.

6. The control system according to claim 1, wherein the evaluating the feasibility of a next intermediate goal is based on verifying that the next intermediate goals follows the intermediate goal in the SoI goals, that from any of the vehicle states at which the intermediate goal is achieved, the next intermediate goal can be achieved.

7. The control system according to claim 6, wherein the achievement of the next intermediate goal is determined by verifying that all states in the goal set of the intermediate goal that can be achieved according to the first model of motion of the vehicle are contained in a backward reachable set of the next intermediate goal.

8. The control system according to claim 1, wherein the evaluating of satisfying the traffic conditions is based on determining that a collision according to the first model of motion of the vehicle and to the first model of motion of the traffic and the state uncertainty set of the first model of the vehicle and a state uncertainty set of the first model of the traffic is avoided.

9. The control system according to claim 8, wherein the determining the collision is avoided, is based on solving an optimization problem that includes a cost function, constraints related to the first model of motion of the vehicle, constraints related to completing the next intermediate goal, constraints related to avoiding collision at a current time, and constraints related to avoiding collision at future times.

10. The control system according to claim 9, wherein the constraints relating to avoiding collision at the current time are determined based on a state of the vehicle and a state of the traffic belonging to a collision set, such that the collision set contains the states of the first model of the vehicle motion and states of the first model of the traffic motion, where a distance between a position of the first model of the vehicle motion and a position of the first model of traffic motion is shorter than a minimum safety margin.

11. The control system according to claim 9, wherein the constraints relating to avoiding collision at the future times are determined by a complement set of a sequence of bad sets from which a collision is unavoidable and are constructed according to the first model of the motion of the vehicle and the state uncertainty set of the first model of the vehicle, and the first model of motion of the traffic and the state uncertainty set of the first model of the traffic, by a forward recursion generating a sequence of sets, such that each set in the sequence of sets determines whether a collision happens in a specific time interval in the future.

12. The control system according to claim 11, wherein the forward recursion starts from the set of states for which there exists no command to the vehicle that avoids the collision in a next time interval according to the first model of the motion of the vehicle and the state uncertainty set of the first model of the vehicle and the first model of motion of the traffic and the state uncertainty set of the first model of the traffic, and proceeds by verifying the set of states for which there exists no command to the vehicle that avoids an entering of the set computed at the previous iteration.

13. The control system according to claim 9, wherein the optimization problem is approximated by a linear program, by
   approximating the first model of motion of the vehicle that considers a profile of heading angles generated according to a set of sharpest curves and according to at least one parameter of motion of the vehicle;
   approximating the constraints related to being able to complete the next goal as a set of linear inequalities that is computed according to a minimum vehicle acceleration and a maximum vehicle acceleration, braking, and steering;
   approximating the constraints of avoiding the future collision as a set of linear inequalities that is computed according to the minimum and the maximum vehicle acceleration and braking; and
   approximating the constraints of avoiding collision at the current time as a set of linear inequalities that is computed based on a wide tube shaped region of states that do not overlap with traffic, and by defining a linear cost function.

14. The control system according to claim 1, wherein the computed feasible intermediate goals are ranked according to a combination of a probability to stay away of risks of a collision, satisfying constraints on the second model of motion of the vehicle, and consistent with the computed feasible intermediate goals selected during a last prediction horizon preventing a collision with at least one vehicle, and consistent with a computed trajectory during the last prediction horizon preventing the collision with the at least one vehicle.

15. The control system according to claim 14, wherein the selecting of the computed feasible intermediate goals is based on assigning probabilities according to the ranking of the computed feasible intermediate goals, so as to produce a set of computed feasible intermediate goals according to their probability.

16. The control system according to claim 14, wherein the consistency with the previous computed feasible intermediate goals is determined based on a preference of using similar computed feasible intermediate goals during different previous prediction horizons.

17. The control system according to claim 14, wherein the constraints on the second model of motion of the vehicle includes a bound on a maximum deviation from a lane, a bound on a maximum allowed steering angle of the vehicle, and a bound on a maximum allowed deviation from a preferred velocity profile.

18. The control system according to claim 14, wherein the consistency of the computed feasible intermediate goal with a trajectory determined during the last prediction horizon is based on a scoring function that measures an amount of change of control input needed to reach the computed feasible intermediate goal, and wherein the computed feasible intermediate goal from the set of computed feasible intermediate goals that minimizes the scoring function is determined as the control input.

19. The control system according to claim 1, wherein the metric of performance includes one of combination of a deviation of a location of the vehicle from a middle of a road, a deviation from a desired velocity profile of the vehicle, a deviation from a minimal distance to an obstacle on the road, and a deviation of a comfort level of the vehicle, such that the comfort level is determined from a desired lateral acceleration, a desired steering rate, and a desired longitudinal acceleration of the vehicle.

20. The control system according to claim 1, wherein the computing of the trajectory for each feasible intermediate goal includes
   determining an initial state of the vehicle, and submitting the initial state to the second model of motion of the vehicle;
   determining, using the second model of motion of the vehicle a set of inputs to the motion model of the vehicle and a set of corresponding state transitions of the vehicle satisfying constraints on the second motion of model of vehicle and reaching a goal set of a determined feasible intermediate goal; and
   determining the metrics of performance of the trajectory, such that the computed trajectory is compared with respect to the metrics of performance in determining the control input.

21. A method for controlling an autonomous vehicle includes computing in real-time, while traveling, trajectories for future prediction horizons along a travel route using sensor data obtained while moving toward a final destination, comprising:
   accepting traffic conditions from sensors;
   storing in a memory data including driving mapped data and vehicle data;
   receiving vehicle state data from vehicle sensors, and determining a vehicle state including a position, a velocity, a heading, a steering angle and a yaw rate of the vehicle using the vehicle state data;
   producing a sequence of intermediate (SoI) goals from the travel route using the stored data, wherein the (SoI) goals includes destination goals, additional goals and optional goals;
   determining present feasible intermediate goals in the SoI goals, such that an intermediate goal is presently feasible if the intermediate goal can be achieved based on a vehicle state and traffic conditions at a beginning of the prediction horizon by satisfying the motion capabilities of the vehicle according to a first model of motion of the vehicle, and the traffic conditions according to a first model of motion of the traffic, and that at least one next intermediate goal following the present feasible intermediate goal in the SoI goals will be feasible, after the present feasible intermediate goal will have been achieved;

computing a trajectory for each present feasible intermediate goal using a second model of motion of the vehicle and a second model of motion of the traffic, and comparing each computed trajectory according to a numerical value determined by a cost function, and the satisfaction of constraints on the movement of the vehicle and the vehicle interaction with the the traffic;

computing a control input via a vehicle controller to at least one actuator of the vehicle so that the vehicle motion produces a trajectory as close to the computed trajectory; and modifying the motion of the vehicle via at least one actuator controller to execute the control input to the at least one actuator of the vehicle, wherein the steps of the method are implemented using a processor of the vehicle.

22. The method according to claim 21, wherein the evaluating the feasibility of a next intermediate goal is based on verifying that the next intermediate goals follows the intermediate goal in the SoI goals, that from any of the vehicle states at which the intermediate goal is achieved, the next intermediate goal can be achieved, wherein the destination goals include specific turns at intersections that are specific in order to reach the final destination, and the additional goals include vehicle operational constraints according to driving rules, and wherein the optional goals includes the vehicle changing lanes without violating any of the destination goals or the additional goals.

23. A non-transitory computer readable memory embodied thereon a program executable by a processor for performing a method, the method for controlling an autonomous vehicle includes computing in real-time, while traveling, trajectories for future prediction horizons along a travel route using sensor data obtained while moving toward a final destination comprising:

producing a sequence of intermediate (SoI) goals from the travel route using driving mapped data and vehicle data, wherein the (SoI) goals includes destination goals, additional goals and optional goals;

determining present feasible intermediate goals in the SoI goals, by satisfying the motion capabilities of the vehicle according to a first model of motion of the vehicle, and the traffic conditions according to a first model of motion of the traffic, and that at least one next intermediate goal following the present feasible intermediate goal in the SoI goals will be feasible, after the present feasible intermediate goal will have been achieved;

computing a trajectory for each present feasible intermediate goal using a second model of motion of the vehicle and a second model of motion of the traffic, and comparing each computed trajectory according to a numerical value determined by a cost function, and the satisfaction of constraints on the movement of the vehicle and the vehicle interaction with the the traffic;

computing a control input via a vehicle controller to at least one actuator of the vehicle so that the vehicle motion produces a trajectory as close to the computed trajectory; and modifying the motion of the vehicle via at least one actuator controller to execute the control input to the at least one actuator of the vehicle, wherein the steps of the method are implemented using a processor of the vehicle.

24. The non-transitory computer readable memory according to claim 23, wherein the the feasibility of a next intermediate goal is based on verifying that the next intermediate goals follows the intermediate goal in the SoI goals, that from any of the vehicle states at which the intermediate goal is achieved, the next intermediate goal can be achieved, wherein the destination goals include specific turns at intersections that are specific in order to reach the final destination, and the additional specific goals include vehicle operational constraints according to driving rules, and wherein the optional goals includes the vehicle changing lanes without violating any of the destination goals or the additional goals.

* * * * *